US008487991B2

(12) United States Patent  (10) Patent No.: US 8,487,991 B2
Zhang et al.  (45) Date of Patent: Jul. 16, 2013

(54) CLEAR PATH DETECTION USING A VANISHING POINT

(75) Inventors: Wende Zhang, Shelby Township, MI (US); Qi Wu, Pittsburgh, PA (US); Tsuhan Chen, Ithaca, NY (US)

(73) Assignees: GM Global Technology Operations LLC, Detroit, MI (US); Carnegie Mellon University, Pittsburgh, PA (US)

( * ) Notice: Subject to any disclaimer, the term of this patent is extended or adjusted under 35 U.S.C. 154(b) by 827 days.

(21) Appl. No.: 12/581,659

(22) Filed: Oct. 19, 2009

(65) Prior Publication Data

US 2010/0097455 A1  Apr. 22, 2010

Related U.S. Application Data

(63) Continuation-in-part of application No. 12/474,594, filed on May 29, 2009, which is a continuation-in-part of application No. 12/108,581, filed on Apr. 24, 2008.

(60) Provisional application No. 61/215,745, filed on May 8, 2009.

(51) Int. Cl.
*H04N 7/00* (2011.01)
*H04N 7/18* (2006.01)

(52) U.S. Cl.
USPC ............ 348/119; 348/113; 348/114; 382/104

(58) Field of Classification Search
USPC .......................... 348/113, 114, 119; 382/104
See application file for complete search history.

(56) References Cited

U.S. PATENT DOCUMENTS 7,376,262 B2   5/2008  Hu
7,440,585 B2  10/2008  Roh
8,131,098 B2 *  3/2012  Watanabe et al. ............. 382/254
2005/0189471 A1 *  9/2005  Nagasawa .................. 250/208.1
2006/0213714 A1  9/2006  Igawa
2009/0022396 A1 *  1/2009  Watanabe et al. ............. 382/167
2009/0037039 A1 *  2/2009  Yu et al. .......................... 701/19

(Continued)

FOREIGN PATENT DOCUMENTS

JP    2003189291 A    7/2003
KR   1020050069060 A   7/2005
KR   1020060021388 A   3/2006

OTHER PUBLICATIONS

Christopher Rasmussen, "Grouping Dominant Orientations for Ill-Structured Road Following", Proceedings of the 2004 IEEE Computer Society Conference on Computer Vision and Pattern Recognition, 2004, pp. 1-8.*
Crisman et al., "Color Vision for Road Following", Proceedings of SPIE Conference on Mobile Robots, Nov. 1988, pp. 1-10.*
U.S. Appl. No. 61/215,745.

(Continued)

*Primary Examiner* — Thomas Dailey

(57) ABSTRACT

A method for estimating a vanishing point in a roadway using a current image generated by a camera on a vehicle includes defining an exemplary vanishing point for each of a plurality of sample images, identifying features within each of the plurality of sample images, monitoring the current image generated by the camera, identifying features within the current image, matching the current image to at least one of the sample images based upon the identified features within the current image and the identified features within the plurality of sample images, determining a vanishing point based upon the matching and the exemplary vanishing points for each of the matched sample images, and utilizing the vanishing point to navigate the vehicle.

10 Claims, 11 Drawing Sheets

U.S. PATENT DOCUMENTS

| | | | |
|---|---|---|---|
| 2009/0268946 | A1 | 10/2009 | Zhang et al. |
| 2009/0268948 | A1 | 10/2009 | Zhang et al. |
| 2009/0295917 | A1 | 12/2009 | Zhang et al. |
| 2010/0017060 | A1 | 1/2010 | Zhang et al. |
| 2010/0033571 | A1* | 2/2010 | Fujita et al. .......... 348/149 |
| 2010/0097456 | A1 | 4/2010 | Zhang et al. |
| 2010/0097457 | A1 | 4/2010 | Zhang et al. |
| 2010/0097458 | A1 | 4/2010 | Zhang et al. |
| 2010/0098290 | A1 | 4/2010 | Zhang et al. |
| 2010/0098295 | A1 | 4/2010 | Zhang et al. |
| 2010/0098297 | A1 | 4/2010 | Zhang |
| 2010/0100268 | A1 | 4/2010 | Zhang et al. |
| 2010/0104137 | A1 | 4/2010 | Zhang et al. |
| 2010/0104199 | A1 | 4/2010 | Zhang et al. |
| 2010/0121577 | A1 | 5/2010 | Zhang et al. |

OTHER PUBLICATIONS

Mallat, S., A Theory for Multi-Resolution Signal Decomposition: The Wavelet Representation, IEEE Transactions on Pattern Analysis and Machine Intelligence, 11, 1989.

Haar, A., Zur Theorie der orthogonalen Funktionensysteme, Mathematische Annalen, 69, 1910, pp. 331-371.

Burges, C. J.C., A Tutorial on Support Vector Machines for Pattern Recognition, 1998, pp. 1-43, Kluwer Academic Publishers, Boston.

Lucas, Bruce D., "An Iterative Image Registration Techique with an Application to Stereo Vision," Proceedings of Imaging Understanding Workshop, pp. 121-130 (1981).

Harris, Chris, "A Combined Corner and Edge Detector," 1988.

Lowe, David G., "Distinctive Image Features from Scale-Invariant Keypoints," International Journal of Computer Vision, Jan. 5, 2004.

* cited by examiner

CLEAR PATH DETECTION USING A VANISHING POINT

CROSS REFERENCE TO RELATED APPLICATIONS

This application is a continuation-in-part of U.S. application Ser. No. 12/474,594 filed on May 29, 2009, which is a continuation-in-part of U.S. application Ser. No. 12/108,581 filed on Apr. 24, 2008. This application claims the benefit of U.S. Provisional Application 61/215,745 filed on May 8, 2009. U.S. application Ser. No. 12/474,594, U.S. application Ser. No. 12/108,581, and U.S. Provisional Application 61/215,745 are incorporated herein by reference.

TECHNICAL FIELD

This disclosure is related to automated or semi-automated control of a motor vehicle.

BACKGROUND

The statements in this section merely provide background information related to the present disclosure and may not constitute prior art.

Autonomous driving systems and semi-autonomous driving systems utilize inputs regarding the road and other driving conditions to automatically control throttle and steering mechanisms. Accurate estimation and identification of a clear path over which to operate a motor vehicle is critical to successfully replacing the human mind as a control mechanism for vehicle operation.

Road conditions can be complex. Under normal operation of a vehicle, the human operator makes hundreds of observations per minute and adjusts operation of the vehicle on the basis of perceived road conditions. One aspect of perceiving road conditions is the perception of the road in the context of objects in and around the roadway and navigating a clear path through any objects. Replacing human perception with technology preferentially includes some means to accurately perceive objects, for example, including stationary objects such as roadside curbs and moving objects such as other vehicles, and road conditions, such as lane markers, potholes, or icy patches upon the roadway, and continue to effectively navigate around such navigational concerns.

Technological means for perceiving an object or road conditions include data from visual cameras and radar imaging. Cameras translate visual images in the form of radiation such as light patterns or infrared signatures into a readable data format. One such data format includes pixelated images, in which a perceived scene is broken down into a series of pixels. Radar imaging utilizes radio waves generated by a transmitter to estimate shapes and objects present in front of the transmitter. Patterns in the waves reflecting off these shapes and objects can be analyzed and the locations of objects can be estimated.

Once data has been generated regarding the ground in front of the vehicle, the data must be analyzed to estimate the presence of objects or road conditions from the data. By using cameras and radar imaging systems, ground or roadway in front of the vehicle can be analyzed for the presence of objects or road conditions that might need to be avoided. However, the mere identification of potential navigational concerns to be avoided does not complete the analysis. An important component of any autonomous system includes how potential navigational concerns identified in perceived ground data are processed and manipulated to identify a clear path in which to operate the vehicle.

One known method to identify a clear path in which to operate the vehicle is to catalog and provisionally identify all perceived navigational concerns and identify a clear path in light of the locations and behaviors of identified concerns. Images may be processed to identify and classify navigational concerns according to their form and relationship to the roadway. While this method can be effective in identifying a clear path, it requires a great deal of processing power, for example, requiring the recognition and separation of different objects in the visual image, for instance, distinguishing between a tree along the side of the road and a pedestrian walking toward the curb. Such methods can be slow or ineffective to process complex situations or may require bulky and expensive equipment to supply the necessary processing capacity.

SUMMARY

A method for estimating a vanishing point in a roadway using a current image generated by a camera on a vehicle includes defining an exemplary vanishing point for each of a plurality of sample images, identifying features within each of the plurality of sample images, monitoring the current image generated by the camera, identifying features within the current image, matching the current image to at least one of the sample images based upon the identified features within the current image and the identified features within the plurality of sample images, determining a vanishing point based upon the matching and the exemplary vanishing points for each of the matched sample images, and utilizing the vanishing point to navigate the vehicle.

BRIEF DESCRIPTION OF THE DRAWINGS

One or more embodiments will now be described, by way of example, with reference to the accompanying drawings, in which.

DETAILED DESCRIPTION

Figure 1:
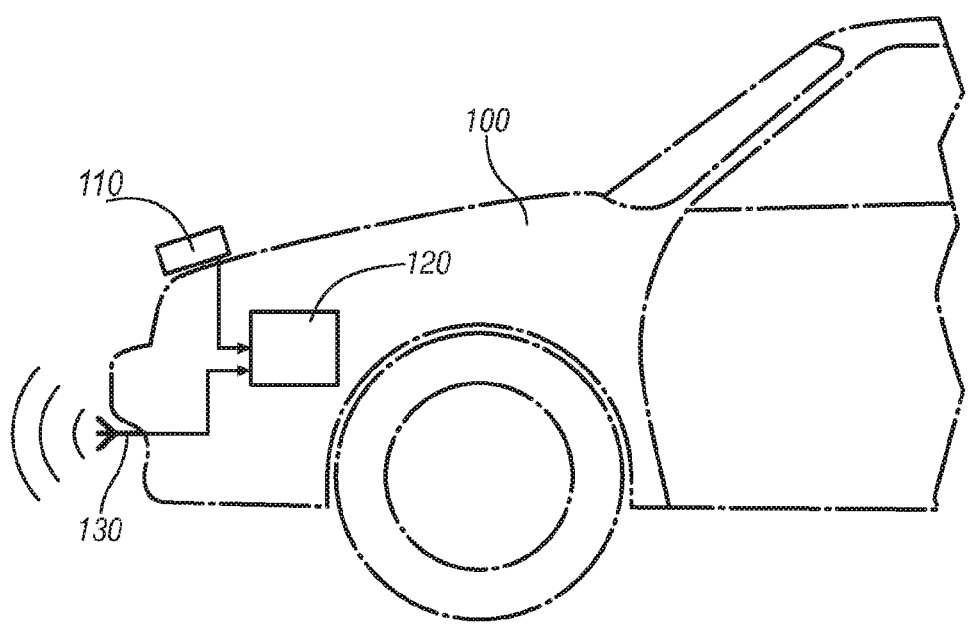
FIG. 1 illustrates an exemplary arrangement of a vehicle equipped with a camera and a radar imaging system in accordance with the disclosure.

Referring now to the drawings, wherein the showings are for the purpose of illustrating certain exemplary embodiments only and not for the purpose of limiting the same, FIG. 1 illustrates an exemplary arrangement of camera 110 located on the front of a vehicle 100 and pointed toward the ground in front of the vehicle 100 in accordance with the disclosure. Camera 110 is in communication with processing module 120 containing logic to process inputs from camera 110. The vehicle 100 may also be equipped with a radar imaging system 130, which, when present, is also in communication with processing module 120. It should be appreciated by those having ordinary skill in the art that the vehicle 100 could utilize a number of methods to identify road conditions in addition or in the alternative to the use of camera 110 and the radar imaging system 130, including GPS information, information from other vehicles in communication with the vehicle 100, historical data concerning the particular roadway, biometric information such as systems reading the visual focus of the driver, a radar imaging system, or other similar systems. The disclosure herein can be applied to various device arrangements and is therefore not limited thereby.

The camera 110 is a device well known in the art capable of translating visual inputs in the form of light, infrared, or other electro-magnetic (EM) radiation into a data format readily capable of analysis, e.g., a digital, pixelated image. In one embodiment, the camera 110 uses a charge coupled device (CCD) sensor to generate images indicating a field-of-view. Preferably, the camera 110 is configured for continuous image generation, e.g., 30 images generated per second. Images generated by the camera 110 may be stored in memory within the camera 110 or transferred to the processing module 120 for storage and/or analysis. Preferably, each image generated by the camera 110 is a two-dimensional image of known pixel dimensions comprising a plurality of identifiable pixels. The plurality of identifiable pixels may be stored and analyzed using an array. Each pixel may be represented in the array as a set of bits or a plurality of sets of bits wherein the bits correspond to a color on a predetermined palette or color map. Each pixel may be expressed as a function of a plurality of color intensity values such as in a red-green-blue (RGB) color model or a cyan-magenta-yellow-key (CMYK) color model. Preferably, each pixel comprises a plurality of sets of bits wherein each set of bits corresponds to a color intensity and a color intensity value e.g., a first set of bits corresponds to a red color intensity value, a second set of bits corresponds to a green color intensity value, and a third set of bits corresponds to blue color intensity value on the RGB color model.

The radar imaging device 130 is a device well known in the art incorporating a transmitter capable of emitting radio waves or other EM radiation, a receiver device capable of sensing the emitted waves reflected back to the receiver from objects in front of the transmitter, and means to transfer the sensed waves into a data format capable of analysis, indicating for example range and angle from the objects off which the waves reflected. Alternatively, the radar imaging device 130 may be replaced or supplemented with a light detection and ranging (LIDAR) system configured to transmit and receive optical energy. The received optical energy may be used to determine object geometric dimensions and/or geometrical proximity to the vehicle 100. It will be noted that radar imaging device 130 is optional and unnecessary to perform many of the methods disclosed herein, wherein processing of visual images is capable of accomplishing clear path detection. The term "clear path" as used herein is to be given its ordinary and customary meaning to a person of ordinary skill in the art (and it is not to be limited to a special or customized meaning), and refers without limitation to a path free of objects exceeding a threshold.

The processing module 120 is illustrated in FIG. 1, and described herein as a discrete element. Such illustration is for ease of description and it should be recognized that the functions performed by this element may be combined in one or more devices, e.g., implemented in software, hardware, and/or application-specific integrated circuitry. The processing module 120 can be a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. In the alternative, processing module 120 can be a digital signal processing (DSP) unit, such as a customized integrated circuit such as a field programmable gate array. The processing module 120 has a set of processing algorithms, comprising resident program instructions and calibrations stored in the non-volatile memory and executed to provide desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The processing module 120 executes algorithmic code stored therein to monitor related equipment such as camera 110 and radar imaging system 130 and execute commands or data transfers as indicated by analysis performed within the processing module. Processing module 120 may include algorithms and mechanisms to actuate autonomous driving control by means known in the art and not described herein, or processing module 120 may simply provide information to a separate autonomous driving system. Processing module 120 is adapted to receive input signals from other systems and the operator as necessary depending upon the exact embodiment utilized in conjunction with the control module.

Figure 2:
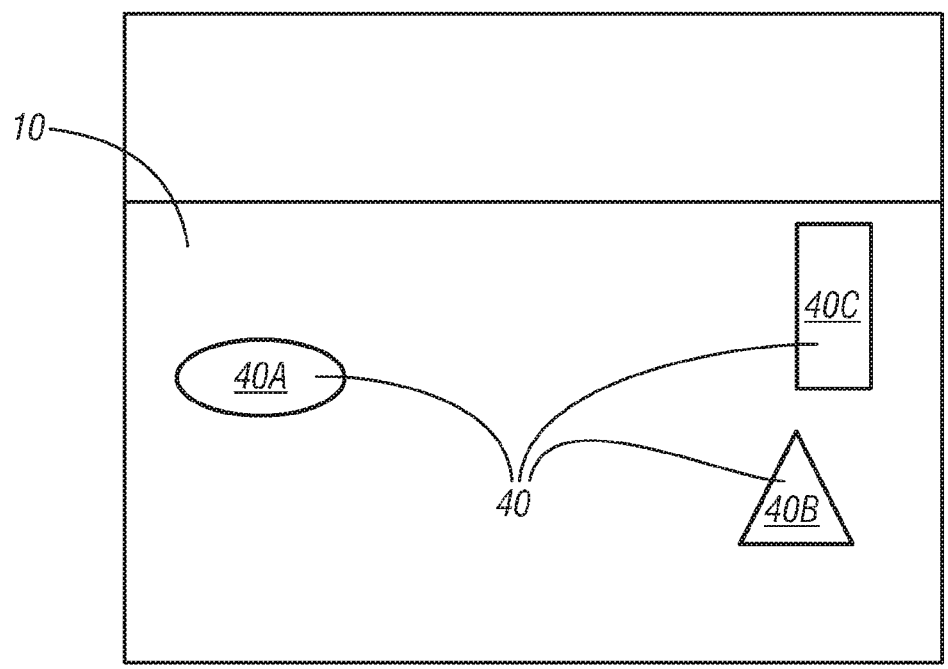
FIG. 2 illustrates a known method to determine a clear path for autonomous driving in accordance with the disclosure.

FIG. 2 illustrates a known method to determine a clear path for autonomous driving in accordance with the disclosure. Image 10 is generated corresponding to the roadway in front of vehicle 100. Through one of various methods, objects 40A, 40B, and 40C are identified within image 10, and each object is categorized and classified according to filtering and trained object behaviors. Separate treatment of each object can be computationally intensive, and requires expensive and bulky equipment to handle the computational load. An algorithm processes all available information regarding the roadway and objects 40 to estimate a clear path available to vehicle 100. Determination of the clear path depends upon the particular classifications and behaviors of the identified objects 40.

Figure 3:
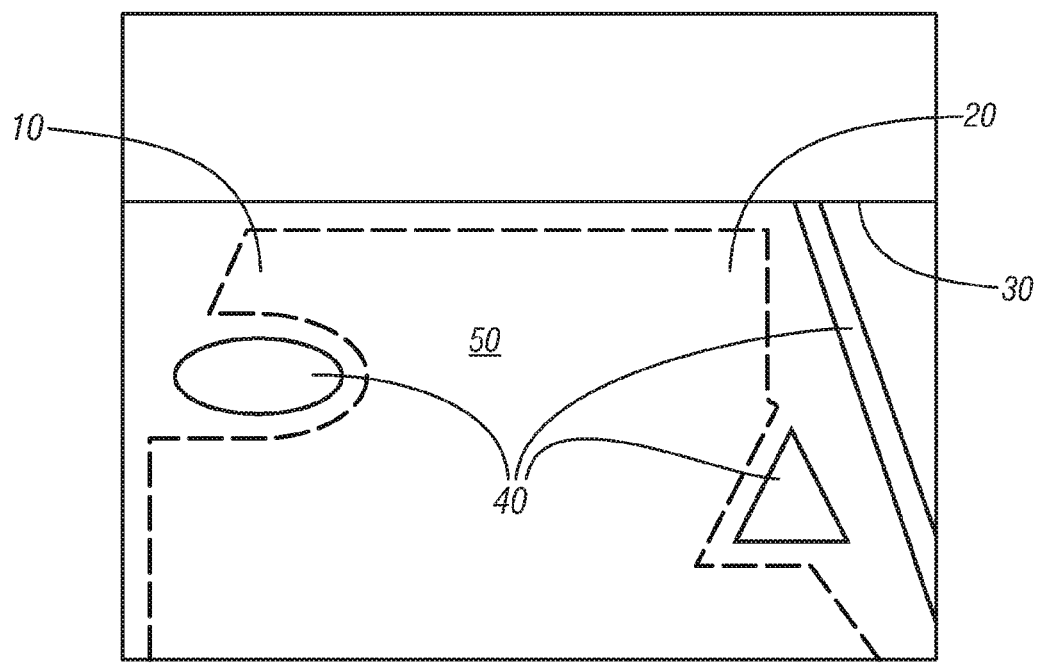
FIG. 3 illustrates an exemplary method to determine a clear path utilizing a likelihood analysis of an image in accordance with the disclosure.

FIG. 3 illustrates an exemplary method to determine a clear path for autonomous or semi-autonomous driving in accordance with the disclosure. Image 10 is depicted including ground 20, horizon 30, and objects 40. Image 10 is collected by camera 110 and represents the road environment in front of vehicle 100. Ground 20 represents the zone of all available paths open to travel without regard to any potential objects. The method of FIG. 3 that determines a clear path upon ground 20 starts by presuming all of ground 20 is clear, and then utilizes available data to disqualify portions of ground 20 as not clear. In contrast to the method of FIG. 2 which classifies every object 40, the method of FIG. 3 instead analyzes ground 20 and seeks to define a clear path confidence likelihood from available data that some detectable anomaly which may represent object 40 limits or makes not clear that portion of ground 20. This focus upon ground 20 instead of objects 40 avoids the complex computational tasks associated with managing the detection of the objects. Individual classification and tracking of individual objects is unnecessary, as individual objects 40 are simply grouped together as a part of the overall uniform limitation upon ground 20. Ground 20, described above as all paths open to travel without discrimination, minus limits placed on ground 20 by areas found to be not clear, define clear path 50, depicted in FIG. 3 as the area within the dotted lines, or an area with some threshold confidence likelihood of being open for travel of vehicle 100.

Object 40 that creates not clear limitations upon ground 20 can take many forms. For example, an object 40 can represent a discrete object such as a parked car, a pedestrian, or a road obstacle, or object 40 can also represent a less discreet change to surface patterns indicating an edge to a road, such as a road-side curb, a grass line, or water covering the roadway. Object 40 can also include an absence of flat road associated with ground 20, for instance, as might be detected with a large hole in the road. Object 40 can additionally include an indicator without any definable change in height from the road, but with distinct clear path implications for that segment of road, such as a paint pattern on the roadway indicative of a lane marker. The method disclosed herein, by not seeking to identify object 40 but by taking visual cues from ground 20 and anything in proximity to the ground in image 10, evaluates a clear path confidence likelihood of clear versus not clear and adjusts the control of vehicle 100 for the presence of any object 40.

Figure 4:
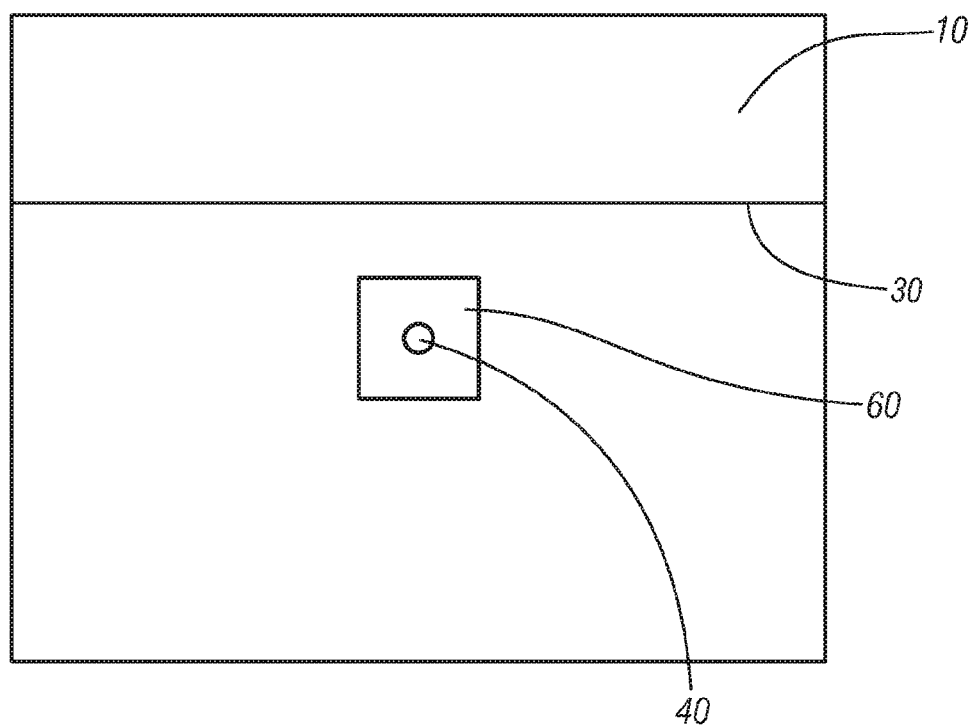
FIG. 4 illustrates an exemplary method to analyze an image in accordance with the disclosure.

Numerous methods for automated analysis of two-dimensional (2D) images are possible. Analysis of image 10 is performed by an algorithm within processing module 120. FIG. 4 illustrates one exemplary method which may be applied to analyze image 10 in accordance with the disclosure. This method subdivides image 10 and identifies a sub-image or patch 60 of ground 20 for analysis, extracts features or analyzes the available visual information from patch 60 to identify any interesting or distinguishing features within the patch, and classifies the patch according to a confidence likelihood of being a clear path according to analysis of the features. Patches with greater than a certain threshold of likeliness are classified as clear, and a compilation of patches can be used to assemble a clear path within the image.

Patch 60, as a sub-image of image 10, can be identified through any known means, such as random search or swarm search of image 10. Alternatively, information regarding the presence of an object 40 available from some other source of information, such as radar imaging system 130, can be used to identify a patch to analyze the portion of image 10 which should describe object 40. Image 10 may require many patches 60 to analyze the whole image. In addition, multiple overlaying patches or patches of different size could be used to fully analyze a region of image 10 containing information of interest. For instance, a small patch 60 might be used to analyze a small dot on the road; however, a large patch 60 might be required to analyze a series of dots which in isolation might seem uninteresting, but in context of the entire series, could indicate an object 40 of interest. In addition, the resolution of patches applied to a particular area may be modulated based upon information available, for instance, with more patches being applied to a region of image 10 wherein an object 40 is thought to exist. Many schemes or strategies can be utilized to define patches 60 for analysis, and the disclosure is not intended to be limited to the specific embodiments described herein.

Once a patch 60 has been identified for analysis, processing module 120 processes the patch by applying known feature identification algorithms to the patch. Additionally, processing module 120 may perform analysis of the location of the patch in context to the location of the vehicle. Feature identification algorithms search available visual information for characteristic patterns in the image associated with an object including features defined by line orientation, line location, color, corner characteristics, other visual attributes, and learned attributes. Feature identification algorithms may be applied to sequential images to identify changes corresponding to vehicle motion, wherein changes not associated with ground movement may be identified not clear path. Learned attributes may be learned by machine learning algorithms within the vehicle, but are most frequently programmed offline and may be developed experimentally, empirically, predictively, through modeling or other techniques adequate to accurately train distinguishing attributes.

Once features in patch 60 have been extracted, the patch is classified on the basis of the features to determine the confidence likelihood that the patch is a clear path. Likelihood analysis is a process known in the art by which a likelihood value or a confidence is developed that a particular condition exists. Applied to the present disclosure, classification includes likelihood analysis to determine whether the patch represents a clear path or if ground 20 in this patch is limited by an object 40. Classification is performed in an exemplary embodiment by application of classifiers or algorithms trained with a database of exemplary road conditions and interactions with detected objects. These classifiers allow processing module 120 to develop a fractional clear path likelihood value for patch 60, quantifying a confidence between zero and one that the features identified within the patch do not indicate a limiting object 40 which would inhibit free travel of vehicle 100. A threshold confidence can be set, defining the clear path likelihood required to define the patch as a clear path, for instance by the following logic:

Confidence=ClearPathLikelihood(*i*)

If_Confidence>0.5,then_patch=clearpath [1]

In this particular exemplary embodiment, a confidence of 50% or 0.5 is selected as the threshold confidence. This number can be developed experimentally, empirically, predictively, through modeling or other techniques adequate to accurately evaluate patches for clear path characteristics.

Figure 5:
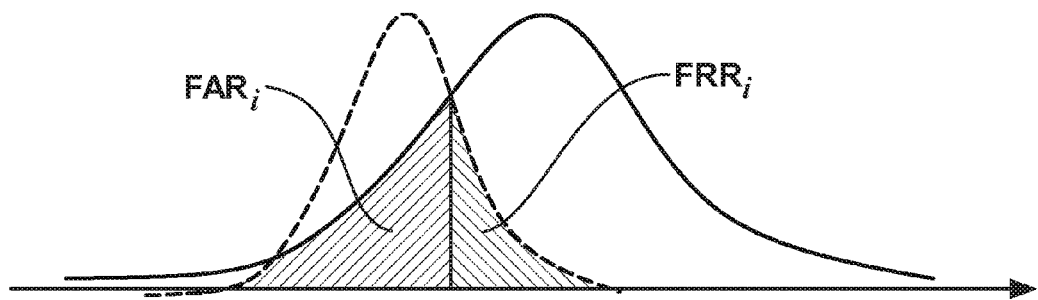
FIG. 5 illustrates an exemplary method to define a classification error by tuning a single threshold in accordance with the disclosure.

The likelihood analysis, as mentioned above, may be performed in one exemplary embodiment by application of trained classifiers to features extracted from a patch. One method analyzes the features a-priori using a training set of images. In this training stage, distinguishing features are selected from a raw feature set, the distinguishing features being defined by methods known in the art, such as Haar wavelet, Gabor wavelet, and Leung-and-Malik filter bank. In addition, 2D image location information based on each feature's minimal classification errors, calculated as the sum of false acceptance rate (FAR) and false rejection rate (FRR), may be utilized by tuning a single threshold as illustrated in FIG. 5. This classification error can be described through the following expression:

ClassificationError(*i*)=$FAR_i$+$FRR_i$ [2]

Information from the trained classifiers is used to classify or weight the feature as indicating a clear path or not clear path, the particular classification depending upon the strength of comparisons to the trained data. Classification of the feature, if the feature is the only feature within the patch, may be directly applied to the patch. Classification of a patch with multiple features identified may take many forms, including the patch being defined by the included feature most indicative of the patch being not clear or the patch being defined by a weighted sum of all of the features included therein.

The above method can be utilized to examine an individual image 10 and estimate a clear path 50 based upon visual information contained within image 10. This method may be repeated at some interval as the vehicle travels down the road to take new information into account and extend the formulated clear path to some range in front of the vehicle's new position. Selection of the interval must update image 10 with enough frequency to accurately supply vehicle 100 with a clear path in which to drive. However, the interval can also be selected to some minimum value to adequately control the vehicle but also not to unduly burden the computational load placed upon processing module 120.

Clear path detection can be accomplished through a single image 10 as described above. However, processing speed and accuracy can be improved with the addition of a second image taken in close time proximity to the original image, such as sequential images from a streaming video clip. A second image allows direct comparison to the first and provides for updated information regarding progression of the vehicle and movement of detected objects. Also, the change of perspective of camera 110 allows for different analysis of features from the first image: a feature that may not have shown up clearly or was indistinct in the first image may display at a different camera angle, stand out more distinctly, or may have moved since the first image, allowing the classification algorithm an additional opportunity to define the feature.

Processing of a second image in relation to the original image 10 can be performed by calculating an image difference. If the image difference of a point of interest, such as a feature identified by radar, is not zero, then the point can be identified as embodying new information. Points where the image difference does equal zero can be eliminated from analysis and computation resources may be conserved. Methods to determine image difference include absolute image intensity difference and vehicle-motion compensated image difference.

Determining an image difference by calculating an absolute image intensity difference can be used to gather information between two images. One method of absolute image intensity difference includes determining equivalent image characteristics between the original image and the second image in order to compensate for movement in the vehicle between the images, overlaying the images, and noting any significant change in intensity between the images. A comparison between the images indicating a change in image intensity in a certain area contains new information. Areas or patches displaying no change in intensity can be de-emphasized in analysis, whereas areas displaying clear changes in intensity can be focused upon, utilizing aforementioned methods to analyze patches on either or both captured images.

Figure 6A:
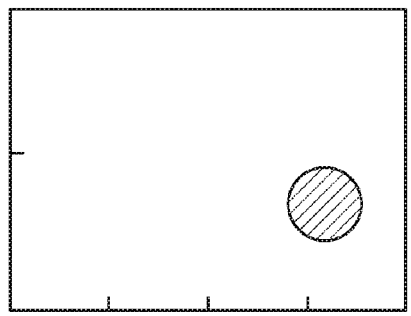
FIGS. 6A, 6B, and 6C illustrate an exemplary determination of an image difference by calculating an absolute image intensity difference in accordance with the disclosure.
Figure 6B:
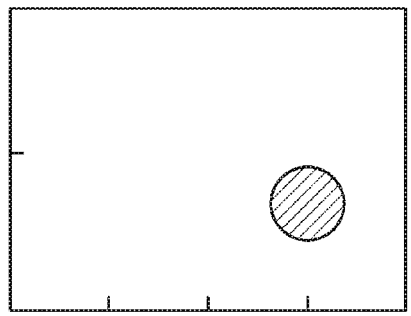
Figure 6C:
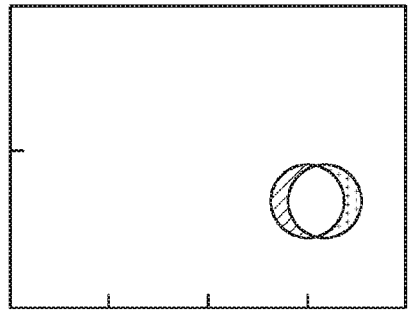

FIGS. 6A, 6B, and 6C illustrate an exemplary determination of an image difference by calculating an absolute image intensity difference in accordance with the disclosure. FIG. 6A depicts an original image. FIG. 6B depicts a second image with changes from the original image. In particular the depicted circular shape has shifted to the left. A comparison of the two images as illustrated in FIG. 6C, an output representing the result of an absolute image intensity difference comparison, identifies one region having gotten darker from the first image to the second image and another region having gotten lighter from the first image to the second image. Such a method can be described as differencing. Analysis of the comparison yields information that some change as a result of movement or change of perspective is likely available in that region of the images. In this way, absolute image intensity difference can be used to analyze a pair of sequential images to identify a potentially not clear path.

Likewise, determining an image difference by calculating a vehicle-motion compensated image difference can be used to gather information between two images. Many methods to calculate a vehicle-motion compensated image difference are known. One exemplary method of vehicle-motion compensated image difference includes analyzing a potential object as both a stationary portion of a clear path and a detected object at the same time. Likelihood analysis is performed on features identified corresponding to the potential object from both classifications at the same time, and the classifications may be compared, for example, through the following logic:

Confidence(*i*)=ClearPathLikelihood(*i*)−DetectedObjectLikelihood(*i*)

If_Confidence>0,then_patch=clearpath [3]

In this exemplary comparison, if confidence(i) is greater than zero, then the patch containing the feature is classified as a clear path. If confidence(i) equals or is less than zero, then the patch containing the feature is classified as not a clear path or limited. However, different values may be selected for the confidence level to classify the patch as a clear path. For example, testing may show that false positives are more likely than false negatives, so some factor or offset can be introduced.

Figure 7:
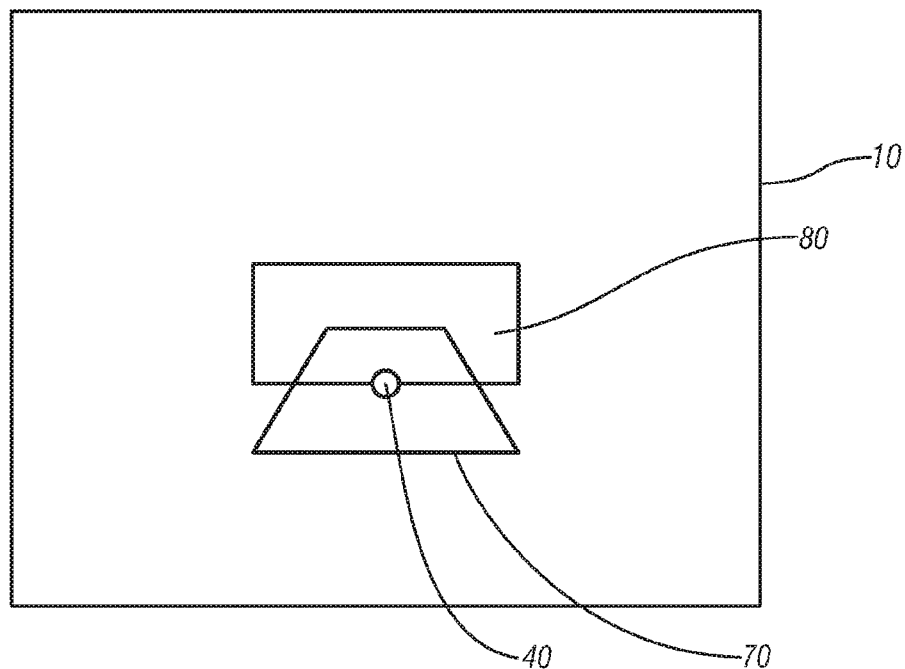
FIG. 7 illustrates an exemplary method to classify a feature as a portion of a clear path and as a detected object at the same time as a method of image analysis in accordance with the disclosure.
Figure 8:
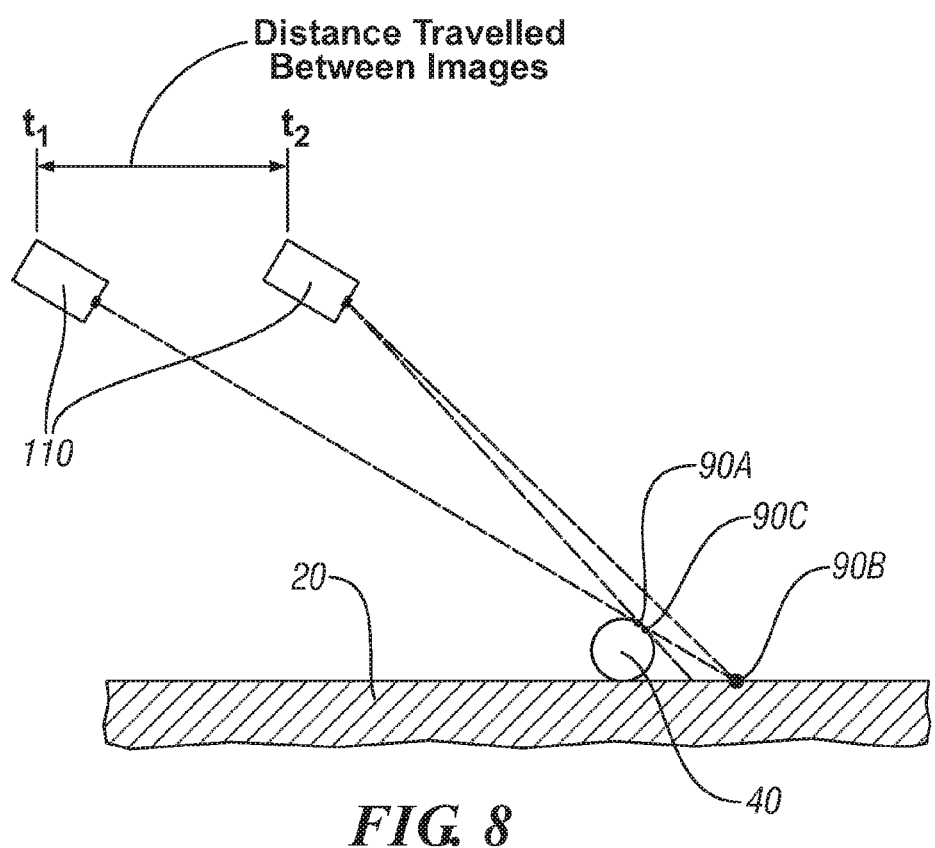
FIG. 8 further illustrates an exemplary method to classify a feature as a portion of a clear path and as a detected object at the same time as a method of image analysis in accordance with the disclosure.

FIG. 7 illustrates one method to classify a feature as a portion of a clear path and as a detected object at the same time as described above in accordance with the disclosure. Image 10 includes object 40, trapezoidal projection 70, and rectangular projection 80. This method utilizes an assumption projecting object 40 as a flat object on the ground within projection 70 to test the classification of the feature as a portion of a clear path. The method also utilized an assumption projecting object 40 as a vertical object within rectangular projection 80 to test the classification of the feature as a detected object. FIG. 8 illustrates comparisons made in data collected between the two images to evaluate the nature of object 40 in accordance with the disclosure. Camera 110 at time $t_1$ observes and captures data from object 40 in the form of a first image. If object 40 is an actual detected object, the profile observed by camera 110 of object 40 at time $t_1$ will correspond to point 90A. If object 40 is a flat object in the same plane as ground 20, then the profile observed by camera 110 of object 40 at time $t_1$ will correspond to point 90B. Between times $t_1$ and $t_2$, camera 110 travels some distance. A second image is captured at time t2, and information regarding object 40 can be tested by applying an algorithm looking at visible attributes of the object in the second image in comparison to the first image. If object 40 is an actual detected object, extending upward from ground 20, then the profile of object 40 at time $t_2$ will be observed at point 90C. If object 40 is a flat object in the same plane as ground 20, then the profile of object 40 at time t2 will be observed at point 90B. The comparison derived through vehicle-motion compensated image difference can directly assign a confidence by application of classifiers based on the observations of points 90, or the comparison may simply point to the area displaying change as a point of interest. Testing of the object against both classifications, as a flat object and as an actual detected object, allows either the area including object 40 to be identified for further analysis through analysis of a patch as described above or direct development of a clear path likelihood and a detected object likelihood for comparison, for example as in logic expression (3) above.

Information available from analysis of the second image can additionally be improved by integration of information regarding movement of the vehicle, such as speed and yaw-rate. Information regarding vehicle motion is available from a number of sources, including the vehicle speedometer, vehicle dynamic sensors or wheel speed sensors, anti-lock braking mechanisms, and GPS location systems. Algorithms may utilize this vehicle movement information, for example, in conjunction with the projections described in FIGS. 7 and 8 to project angles which should exist in a feature laying flat on the ground in the second image based upon data from the first image and the measured movement of the vehicle between the images.

The number of images utilized for comparison need not be limited to two. Multiple image analysis can be performed at multiple iterations, with an object being tracked and compared over a number of cycles. As mentioned above, computational efficiency can be gained by utilizing image difference analysis to identify points of interest and eliminating areas with zero difference from subsequent analyses. Such efficiencies can be used in multiple iterations, for example, saying that only points of interest identified between a first and second image will be analyzed in the third and fourth images taken. At some point, a fresh set of images will need to be compared to ensure that none of the areas showing zero difference have had any change, for example a moving object impinging upon a previously identified clear path. The utilization of image difference analyses and of focused analyses, eliminating areas identified with zero change, will vary from application to application and may vary between different operating conditions, such as vehicle speed or perceived operating environment. The particular utilization of image difference analyses and of focused analyses can take many different embodiments, and the disclosure is not intended to be limited to the specific embodiments described herein.

Multiple methods are herein disclosed for using the clear path detection analysis to identify a clear path including patch-based methods and pixel-based methods. The methods herein are preferably executed in the processing module 120, but may be combined in one or more devices, e.g., implemented in software, hardware, and/or application-specific integrated circuitry. Patch-based methods are described above and herein with reference to FIG. 9. Pixel-based methods are described herein with reference to FIGS. 11 and 12. It will be appreciated that pixel-based methods make decisions based upon pixel or a group of pixels. This decision for the component patch being analyzed can be based upon pixels contained within the patch, for example, with the patch being determined to be unclear if any or some minimum number of pixels within the patch are determined to be not clear. Exemplary pixel-based methods include textureless and texture-rich methods. Texture-rich methods analyze pixelated features in an image for distinct interest points based upon a contextual view within the image. The interest points are mapped corresponding to a field-of-view in from on the vehicle 100 and a clear path is determined based upon topography of the interest points within the map. Textureless methods filter from an image non-conforming regions of the image as not belonging to a planar, consistent road surface, remaining pixels correspond to the clear path. As described hereinabove, patch-based methods are computationally, relatively fast, while pixel-based methods are computationally, relatively slow.

Figure 9:
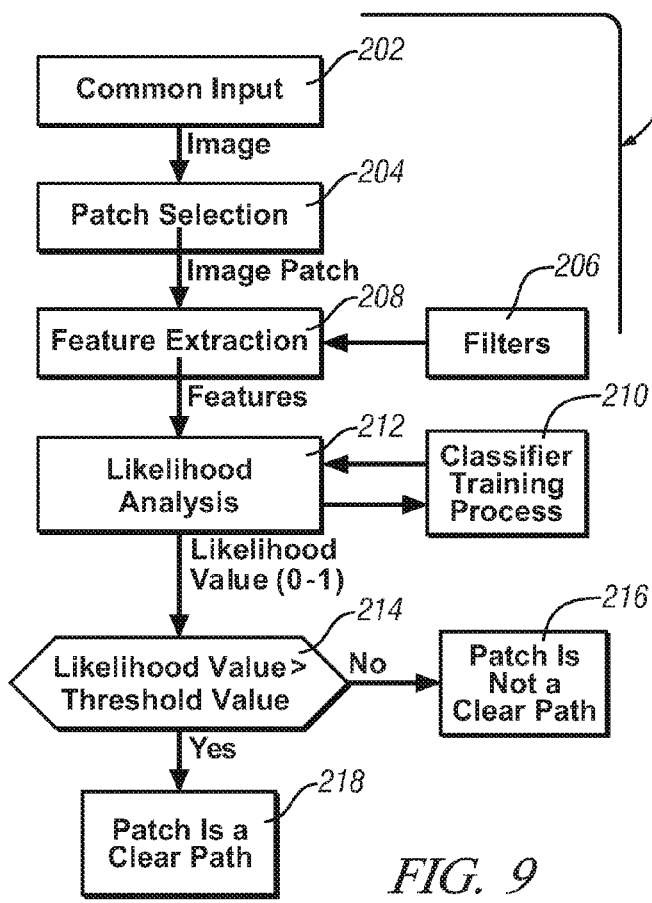
FIG. 9 is a flowchart for an exemplary patch-based method for detecting a clear path in accordance with the disclosure.

FIG. 9 illustrates an exemplary patch-based method 200 wherein input from a camera is analyzed to determine a clear path likelihood in accordance with the disclosure. The patch-based method 200 is illustrated in FIG. 9, and described herein as comprising discrete elements. Such illustration is for ease of description and it should be recognized that the functions performed by these elements may be combined in one or more devices, e.g., implemented in software, hardware, and/or application-specific integrated circuitry. For example, the patch-based method 200 may be executed as one or more algorithms in the processing module 120.

During operation, the camera 110 generates an image for analysis in the processing module 120 (202). The processing module 120 identifies patches in the image and selects a patch for analysis (204). Multiple methods for defining a plurality of patches sufficient to adequately analyze the image are contemplated by this disclosure. As described above, patches may be defined according to random search or swarm search methods. Alternatively, information from some other source of information, such as a radar imaging system, can be used to define a patch to analyze the portion of the image. In addition, multiple overlaying patches can be utilized based upon the perceived area of interest upon the image to be analyzed. Additionally, methods can be utilized to define patches according to anticipated road surface in front of the vehicle and resulting clear path patterns, for example, including a fixed-grid patch method, sectioning off some or all of the image according to a regular patch pattern, and a perspective patch method, similar to the fixed-grid patch method except that the patch sizes and/or shapes are modulated based upon a perspective view of the road and consideration for an amount of road surface contained within each of the patches. Such an anticipated road surface in front of the vehicle can be adjudged by an initial review of the input image, for example, utilizing clearly visible lines that could define lane boundaries as an initial reference to define a patch pattern. In another example, a patch pattern from an immediately previous iteration of the clear path method could be utilized and slowly modulated through the iterations, based upon the iteratively defined clear path and other indications that can be identified within the analyzed images.

The fixed-grid patch method identifies and divides the image into a plurality of patches based upon an area of interest and applies a fixed-grid pattern to the area of interest. The fixed-grid pattern sections substantially the entire area of interest in patches. The area of interest preferably encompasses the field-of-view immediately in front of the vehicle, however the area may be defined to encompasses more narrow fields-of-view. In one embodiment, the area of interest encompasses the field-of-view immediately in front of the vehicle and delimited by a horizon line or a vanishing point perceived for the roadway. The fixed-grid patch method can include patch tracking, identification, and analysis via a matrix, wherein each patch may be identified by a number of a number series.

The fixed-grid patch may be applied to the image using a number of methods. A first method includes applying the fixed-grid patch to sequential images using equal image coordinates. A second method includes applying the fixed-grid patch to the image using an identified interest point on the image, e.g., the horizon line. A third method includes applying the fixed-grid patch to the image compensating for vehicle movement, e.g., vehicle yaw.

The perspective patch method identifies and divides the image into a plurality of patches based upon field-of-view coordinates rather than image coordinates. An area of interest is identified as described hereinabove, wherein a perspective patch pattern is applied to the area of interest based upon estimated field-of-view coordinates, allocating patch size relative to an approximate area of ground covered by each patch. Such perspective patch definitions allow for a more detailed review of patches describing ground closer to the vehicle and less wasteful review of patches describing ground more distant from the vehicle. Patches can be aligned to the perceived lanes of travel upon the roadway, for example, as defined by lane markers and/or curbsides. Such patch definitions will frequently be trapezoidal, with the parallel sides of the trapezoids being parallel to the horizon or horizontal axis of the vehicle, and with the remaining sides of the trapezoids being dependent upon the defined road surface in the image view. Such a patch alignment is efficient to defining the road surface. However, computation of the grid of patches and the analysis of the patches is complicated by the many different shapes. The patches can instead be normalized to rectangle (or square) shapes, still parallel to the horizon or horizontal axis of the vehicle. Such rectangular patches are in ways less efficient in covering the road surface, for example, with portions of the curbside overlapping patches including actually clear roadway, but sufficient resolution of the patches and improved the computational efficiency can make such normalized perspective patches beneficial.

A filter or a set of filters may be applied to the selected patch (206), e.g., a lighting normalization filter. An exemplary normalization filter changes the range of pixel intensity values within the patch, thereby bringing the patch into a range that is more suitable for machine processes. For example, normalizing each pixel value to a zero mean and unit variance enhances the image contrast, specifically in a low lighting environments or when contrast is poor due to glare. A number of exemplary filters and filtering methods useful for image analysis are envisioned, and the disclosure is not intended to be limited to the particular exemplary embodiments described herein.

After filtering, feature extraction is executed on the selected patch using feature extraction algorithms (208). Feature extraction algorithms may analyze the selected patch for predetermined features, e.g., edges, corners, and blobs, and/or shapes, e.g., circles, ellipses, and lines. It will be appreciated that some features have meaning and others do not, and a process of feature selection can be utilized to identify a group of best features for analysis. A classifier training algorithm analyzes each feature and assigns a likelihood value (210). As mentioned above, classifiers or logic used in developing likelihood values are initially trained offline. Training may optionally be continued in the vehicle based upon fuzzy logic, neural networks, or other learning mechanisms known in the art. These trained classifiers perform a likelihood analysis upon the features extracted, and a likelihood value for the patch is determined. This likelihood value expresses a confidence that the selected patch is clear.

The likelihood analysis may be augmented using spatially and/or temporally related patches to evaluate identified features during vehicle operation. When the feature extraction algorithm has identified a feature, the processing module 120 may spatially analyze the identified feature for consistency among adjacent or nearby patches. A feature identified in one patch may be compared to surrounding patches to determine if it is an aberration or consistent with the surrounding patches. A feature that is consistent with surrounding patches may be assigned a similar likelihood value to the surrounding patches, whereas a feature not consistent with surrounding patches can be assigned a different likelihood value. Similarly to the spatial analysis, when the feature extraction algorithm has identified a feature, the processing module 120 may temporally analyze the identified feature for consistency among temporally related patches, compensating for vehicle motion. For example, a feature analyzed in several frames and determined to have a high likelihood value through the image frames can be temporally compared to the same feature receiving a low likelihood value in a later frame. If the temporal analysis of the feature reveals new information, such as movement of the feature with respect to the roadway or increased perspective revealing the feature to be indicative of an object situated upon the road surface, then the lower likelihood value for the feature can be confirmed. If no new information is available, then the lower likelihood value for the feature in the present frame can be suspended as not necessarily indicating a not clear path. Subsequent frames can be analyzed similarly to establish the feature as significant or not. Similarly, according to methods described herein, the questionable feature can be analyzed with increased computational emphasis, either in the present image or in subsequent images.

The processing module 120 compares the likelihood value to a threshold likelihood value (214). If the likelihood value is greater than the threshold value, then the patch is identified as a clear path (218). If the likelihood value is not greater than the threshold value, then the patch is identified as a not clear path.

As described above, the patch-based method 200 may be repeated or reiterated in a number of ways, with the same image being analyzed repeatedly with the selection and analysis of different patches, and an identified patch can be tracked and analyzed for change over a number of sequential images.

Figure 10:
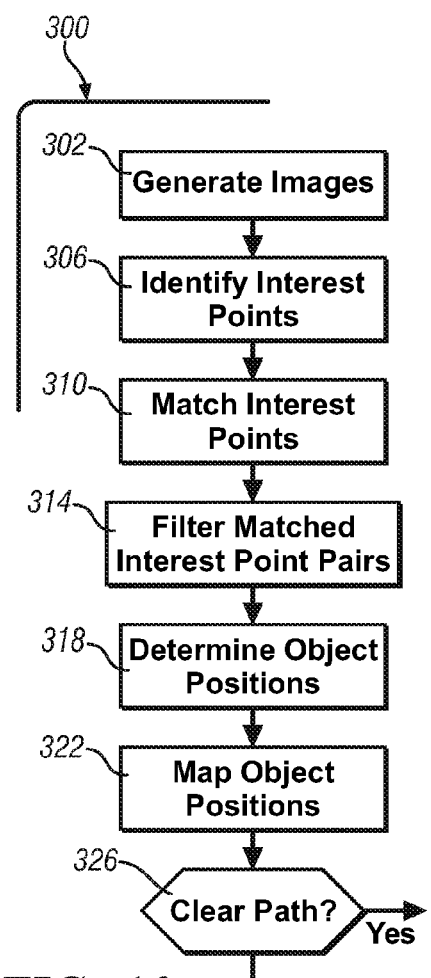
FIG. 10 is a flowchart for a textureless pixel-based method for detecting a clear path, in accordance with the disclosure.

FIG. 10 illustrates an exemplary texture-rich pixel-based method 300 wherein input from a camera is analyzed to determine a clear path likelihood in accordance with the disclosure. The texture-rich pixel-based method 300 is illustrated in FIG. 10, and described herein as comprising discrete elements. Such illustration is for ease of description and it should be recognized that the functions performed by these elements may be combined in one or more devices, e.g., implemented in software, hardware, and/or application-specific integrated circuitry. For example, the pixel-based method 300 may be executed as one or more algorithms in the processing module 120.

During operation, the camera 110 generates an image for analysis in the processing module 120 (302). The processing module 120 analyzes the image for interest points, for example, examining pixel color intensity as described hereinabove and comparing the pixel or a group of pixels with surrounding pixels. An interest point is an identifiable pixel on an image and is associated with a set of visual information, i.e., texture-rich features, and is associated with objects located in the field-of-view. Through methods known in the art, e.g., a scale-invariant feature transform (SIFT), methods employing corner detection or other shape detection, or a Sobel filter, interest points can be identified and utilized to accomplish methods described herein (306). In one embodiment, redundant interest points, e.g., multiple interest points corresponding to the same feature, are removed for computational efficiency considerations.

Once the interest points are identified, the processing module 120 compares sequential images when the vehicle is in motion to match interest points from each image to corresponding points in the sequential images which correspond to the same points in the field-of-view, where possible (310). Matching includes using correspondence matching programming, e.g., a scale-invariant feature transform (SIFT) feature matching programming and optical flow programming, and may further include locating corresponding points through template matching, taking into account movement of the host vehicle, and making a best estimate whether two points represent the same object or feature visible in the field-of-view. Template matching may be determined using one of multiple methods, including one of several known template matching programming methods to find the corresponding interest points, e.g., Lucas-Kanade or Horn-Schunck. The resulting matched point pairs correspond to a same feature located on both images wherein the same feature is associated with a same object in the field-of-view. While interest points can be matched, not all matched corresponding point pairs represent high quality corresponding point pairs that allow the identification of their three-dimensional positions in the field-of-view for classifications as a clear path for the vehicle to travel through.

The processing module 120 filters the matched corresponding point pairs in order to identify high quality corresponding point pairs that can be utilized for three-dimensional position identification with high confidence (314). Preferential matched point pairs may be selected based upon quality control criteria, e.g., distance between points, distance from image boundary, and color similarities between respective neighboring pixels. Selection of criteria to judge matched pairs can additionally be made based upon conditions such as light level present outside the vehicle, weather, speed of the vehicle, and any other factor affecting an ability to judge matched pairs or an urgency to quickly and accurately define a clear path.

The high quality corresponding point pairs are analyzed to determine three-dimensional positions of objects in the field-of-view represented by the corresponding point pairs (318). It will be appreciated that corresponding points at different heights as compared to ground level will move differently between sequential images. Analyzing movement of the interest points between sequential images can yield estimated three-dimensional coordinates of the interest points. Object position can be determined based upon the high quality corresponding point pairs, sample time between sequential images, and vehicular data such as vehicle speed, and vehicle yaw rate. These methods of triangulation can yield a position of the object in a horizontal plane and a height of the object in relation to a ground level.

The determined object positions are utilized to map object positions in front of the host vehicle including an estimated topography of the field-of-view (322). The topography may be estimated by assigning predetermined spatial dimensions around the object. Preferably, the predetermined spatial dimensions diminish with respect to height at a predetermined rate with respect to distance from the object. Using the map and estimated topography the processing module 120 can determine a clear path in front of the host vehicle (326).

The above method utilizes sequential images to establish a map of object positions and vertical heights in front of the vehicle, such that a clear path can be defined. It will be appreciated that in any two given images, a particular object might not be classified as including two high quality interest points sufficient to be mapped in that particular analysis. However, the above analysis occurs multiple times per second of vehicle travel. As the vehicle travels forward through the clear path, different perspectives upon an object will be gained and a large number of images will be analyzed. Travel over a path and analysis of the multiple iterative images through that path build a confidence through the analyses that no object contradicting the clear path exists in the identified clear path.

Figure 11:
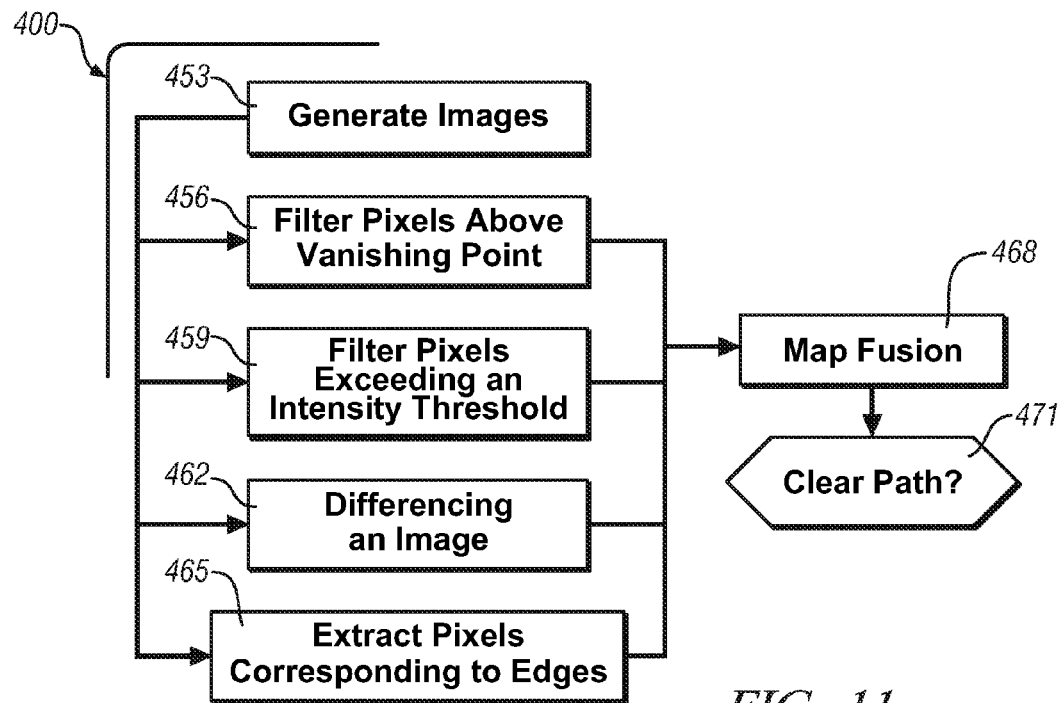
FIG. 11 shows an exemplary image used to illustrate a vehicle detection analysis, in accordance with the disclosure.

FIG. 11 illustrates an exemplary textureless pixel-based method 400 wherein input from a camera is analyzed to determine a clear path likelihood in accordance with the disclosure. The textureless pixel-based method 400 is illustrated in FIG. 11, and described herein as comprising discrete elements. Such illustration is for ease of description and it should be recognized that the functions performed by these elements may be combined in one or more devices, e.g., implemented in software, hardware, and/or application-specific integrated circuitry. For example, the textureless pixel-based method 400 may be executed as one or more algorithms in the processing module 120.

During operation, the camera 110 generates an image for analysis in the processing module 120 (453). The processing module 120 analyzes the image using multiple filtering methods to identify and remove non-conforming pixels from the image. Remaining pixels indicate a potential clear path for the vehicle to travel. FIG. 11 shows the textureless pixel-based method 400 including four exemplary filtering methods to identify and remove non-conforming pixels from the image. A textureless method could be used with some portion of the four exemplary methods and/or can include unnamed but similar methods to process the image.

A first exemplary filtering method removes pixels above a horizon or vanishing point, including sky and other vertical features that cannot be part of a road surface (456). The term "vanishing point" as used herein is a broad term, and is to be given its ordinary and customary meaning to one ordinarily skilled in the art, and refers to an infinite far point on the horizon that is intersected by multiple parallel lines on the ground in the view. Identifying a road surface creating a clear path on which to drive is necessarily below the vanishing point or horizon line. Filtering images to only analyze an area below the horizon line helps to clarify the pixels being analyzed to identify a road surface from irrelevant pixels. As one skilled in the art appreciates, there are many known methods for determining a vanishing point and corresponding horizon line.

A second exemplary filtering method applies a filter based upon variance in pixel color intensity, based upon a premise that a road surface will include a large surface with a visual intensity common across the surface (459). Pixels are removed from the image when its associated pixel color intensity varies greater than a predetermined threshold. For pixels associated with multiple colors, a pixel color intensity of any particular color that varies greater than the predetermined threshold may be removed from the image. The predetermined threshold may be updated based upon historical color intensity of pixels identified as clear.

A third exemplary filtering method applies a filter based upon differencing sequential images, allowing analysis of changes between the images (462). Pixels associated with a pixel color intensity that changes greater than a predetermined threshold from the sequential images may be removed from the image. In one embodiment, the adjustments are made to the images based upon motion of the vehicle so that pixels are differenced and compared as if all pixels correspond to points at a ground level. Known triangulation methods may be used for determining motion adjustments to the images. By using an assumption that all objects in the image are at ground level, non ground level points may be identified by changes not consistent with pixels associated with the ground level. For example, pixels above ground level may move faster between sequential images than would be expected, and this movement may be identified by examining the difference between pixel color intensities between sequential images.

A fourth exemplary filtering method applies a filter based upon identifying pixels representing edges or transitions in the visual data (465). To create the fourth filtered image, the processing module 120 extracts pixels from the image based upon color intensity values that correspond to edges using one of several known edge detection filters, e.g., a Sobel filter. The edge detection filter is preferably executed in the processing module 120, but may be combined in one or more devices, e.g., implemented in software, hardware, and/or application-specific integrated circuitry. In one embodiment, each pixel is analyzed using a Sobel operator. The Sobel operator computes a gradient vector of color intensity at each pixel resulting in a direction of the largest possible increase from light to dark and the rate of change in that direction. Points corresponding to a rate of change exceeding a threshold and corresponding to gradient vectors at nearby pixels indicate edges and are included in the fourth filtered image. Those pixels are included in the image while the others are removed.

Applying the various methods in parallel, the results can be the fused into a single map of the image (468). Fusion includes pixels identified in each of the various filtering methods. Pixels on the fused clear path map correspond to desirable driving locations in the field-of-view. Locations on the fused clear path map without pixels correspond to undesirable driving locations in the field-of-view. The processing module 120 may analyze the map for visual data indicative of a clear path of travel (471).

The textureless pixel-based method 400, described in FIG. 11, applies various methods to images in parallel to identify features in a view relevant to defining a clear path. However, it will be appreciated that these methods need not be performed in parallel, but rather the methods can be used to process images sequentially in steps or selectively to identify features in a view relevant to defining a clear path.

An addition pixel-based clear path detection method includes applying a fused texture-rich and textureless method.

The texture-rich and textureless methods can be fused in a number of ways. An image with identified points and determined heights identified with texture-rich methods can be overlaid with a filtered image generated by textureless methods, and agreement of the two methods can be used to define a clear path through the overlaid image. In an alternative method to fuse the two schemes, the data from each of the two schemes can be used to project information upon a programmed overhead map of an area in front of the vehicle, and this overhead map including data gained from analysis of the two schemes can include building confidence indications for regions of the map. In an alternative method to fuse the two schemes, one scheme can be utilized as a primary or dominant scheme, and the second scheme can be utilized or activated to analyze regions in the view identified as ambiguous or unclear. In any method to fuse the two schemes, strengths of one processing scheme can be used to reduce weaknesses of the other processing scheme. If both schemes concur that the path is clear, then the processing module employing the schemes may determine with increased confidence that the path is desirable for the vehicle to traverse. A number of methods to fuse the identified schemes are envisioned, and the disclosure is not intended to be limited to the particular embodiments described herein. Additionally, either scheme or both schemes can be combined with the method employed above utilizing analysis of patches.

An example-based method can be utilized alternatively or additionally to define a clear path based upon an input image. An exemplary example-based method collects a number of sample images of views, defining a clear path for each of the sample images, matches a current image to one or more of the sample images, and determines a clear path based upon the matching. Matching the current image to one or more of the sample images can be accomplished, for example, by extracting features from each of the sample images, extracting features from the current image, comparing the extracted features from the current image to a database of extracted features from the sample images, and selecting matching sample images to the current image. A clear path can be selected from the best matching sample image or can be determined based upon a combination of the closest matches to the current image.

Hierarchical configurations of multiple clear path detection algorithms may be incorporated into this disclosure, including algorithms arranged based upon computational intensity. Less computationally intensive detection methods can identify clear paths in the image and leave remaining sections of the image not identified as a clear path for more computationally intensive analysis thereby increasing computational efficiency for clear path identification. The particular methods utilized and the hierarchical structure of the particular hierarchical method used can differ or change. In an exemplary hierarchical configuration, a patch-based clear path detection method identifies clear paths in the image before a pixel-based clear path detection method analyzes the remaining sections of the image not identified as a clear path by the patch-based method. In one embodiment, a second exemplary hierarchical layer utilizing an example-based method further analyzes sections not identified as a clear path by the pixel-based method. However, a number of different hierarchical configurations are envisioned, and the disclosure is not intended to be limited to the particular embodiments described herein.

An additional method is disclosed for detecting a clear path of travel for a vehicle by segmenting an image generated by a camera device located upon the vehicle. This segmentation-based method includes monitoring the image, analyzing the image to segment a region of the image that cannot represent the clear path of travel from a region of the image that can represent the clear path of travel, defining the clear path of travel based upon the analyzing, and utilizing the clear path of travel to navigate the vehicle. Analysis methods used to segment the image include but are not limited to a motion analysis between a plurality of sequential images to identify a region of the image that cannot be the clear path, a texture analysis of the image to identify a region of the image that cannot be the clear path, a color analysis of the image to identify a region of the image that cannot be the clear path; and a geometric analysis of the image to identify a region of the image that cannot be the clear path.

Additional methods are herein disclosed for detecting a clear path of travel for the vehicle 100 including methods based upon a vanishing point of a roadway in front of the vehicle. The term "vanishing point" as used herein is a broad term, and is to be given its ordinary and customary meaning to one ordinarily skilled in the art, and refers to an infinite far point on the horizon that is intersected by multiple parallel lines on the ground in the view. Multiple methods are herein disclosed for estimating the vanishing point including an example-based vanishing point estimation analysis. Information regarding an operational environment of the vehicle, including detection of the vanishing point, can be used to define or enhance a clear path. For example, clear path detection methods described above, including patch-based, pixel-based, and example-based methods, may be augmented using vanishing point estimation analysis. Estimation of the vanishing point can be used to strengthen confidence in clear paths identified in the field-of-view. Similarly, clear path detection analysis can be used to augment the vanishing point estimation analysis as described herein below.

Figure 12:
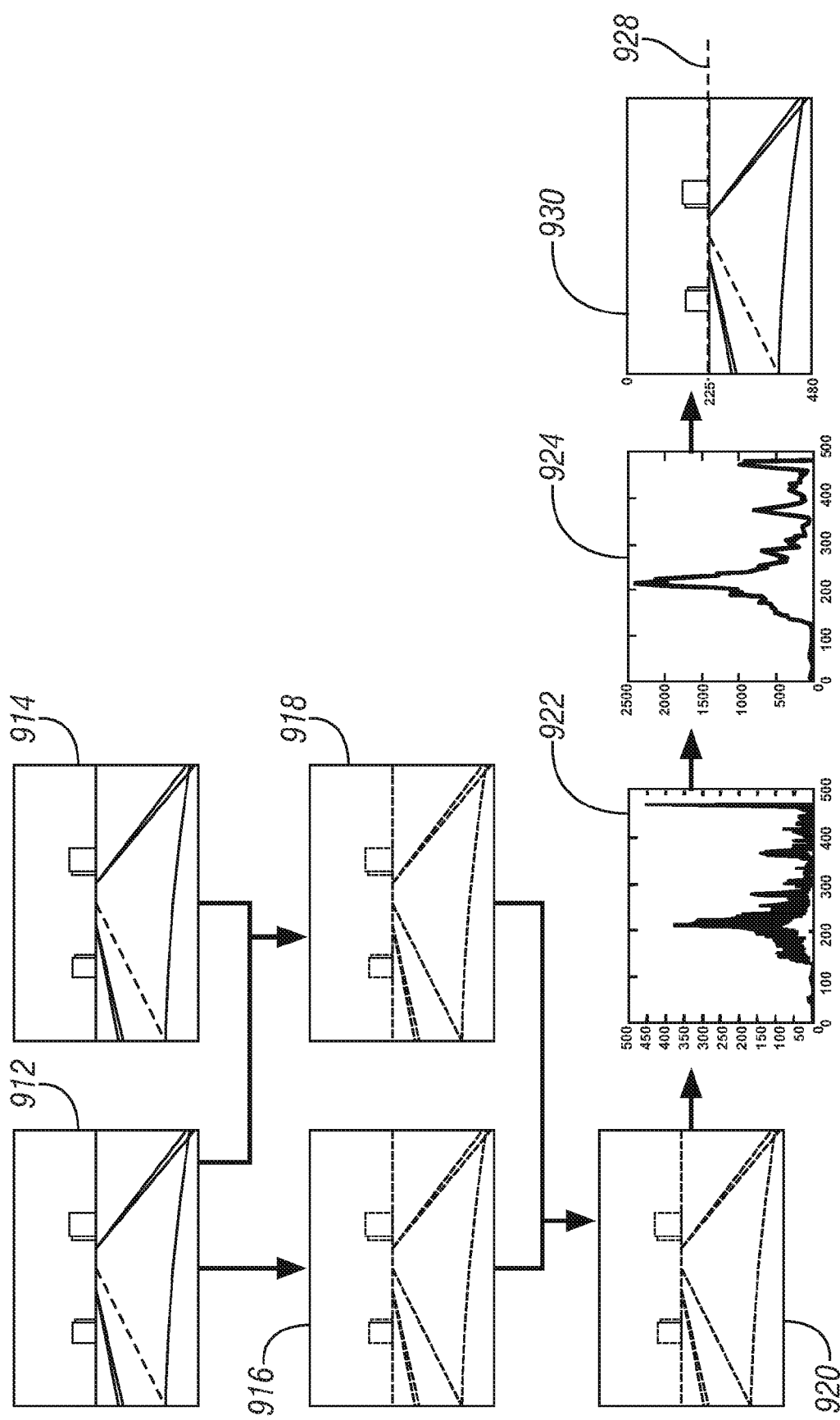
FIG. 12 shows an exemplary method for horizon line identification and analysis, in accordance with the disclosure.

A first method for estimating a vanishing point includes determining a horizon line and estimating the vanishing point based upon the horizon line, and is described with reference to FIG. 12. FIG. 12 is a flow chart showing the first method for estimating vanishing point in an image. The first method includes analyzing the field-of-view in front of the vehicle 100 using a camera-based system such as the camera 110.

The first method for estimating vanishing point in an image includes determining a horizon line of the image. The vanishing point is estimated based upon the horizon line. The first method includes iteratively analyzing images as the processing module 120 receives images generated by the camera 110. Sequential images are shown including a first image 912 at time k and a second image 914 at time k+1 of a roadway in front of the vehicle 100. The processing module 120 generates a filtered image 916 of the image 912 using known edge detection filters, e.g., a Sobel filter, to identify horizontal edges in the image 912. Pixels contained in the image 912 are included on the filtered image 916 if a filter response corresponding to the pixel exceeds a predetermined threshold. The combination of pixels exceeding the predetermined threshold form the filtered image 916.

The processing module 120 identifies image areas substantially unchanged between sequential images to generate a differencing image 918. Image areas exhibiting no change between sequential images indicate information about the corresponding field-of-view. For example, the image area may be associated with features in the field-of-view further away from the vehicle 100. Similarly, image areas exhibiting change between sequential images indicate information about the corresponding field-of-view. For example, the image area may be associated with features in the field-of-view near the vehicle 100. In one embodiment, identifying image areas on the second image 912 substantially unchanged from the first image 914 includes differencing the first and second image 912 and 914. Differencing images may be accomplished using one of multiple methods, such as the methods described hereinabove. The horizon line of the field-of-view generally exhibits little change between sequential images and thus is likely to be included in the differencing image.

The processing module 120 generates a combined image 920 by combining the differencing image 918 and the filtered image 916. The combined image 920 includes pixels that correspond to horizontal edges and pixels that correspond to features in the field-of-view that are substantially unchanged between sequential images. The pixels are represented in an exemplary combined image 920 by a black color intensity. The combined image 920 includes a plurality of identifiable horizontal row of pixels.

The combined image 920 is analyzed according to the black color intensity pixels associated with each horizontal row. The number of black pixels included in a horizontal row is determined for each horizontal row of the combined image 920. The processing module 120 generates a historical histogram 922 for a predetermined number of combined images using the number of black pixels associated with each of the horizontal rows. The historical histogram catalogs the number of black pixels on a particular horizontal row for each of the predetermined number of combined images.

The processing module 120 preferably filters the historical histogram for noise using one of multiple known methods, e.g., a Gaussian filter, to generate a filtered histogram 924 based upon historical histogram 922. The processing module 120 identifies the horizontal line that includes the greatest number of black pixels. The horizontal line that includes the greatest number of black pixels defines the horizon line. A maximum peak 926 in the filtered histogram 924 corresponds to horizontal line number 225 on the image 912. The horizon line 928 in image 930 is the horizontal line including the greatest number of black pixels and defines the horizon line of image 912. The vanishing point is a point on the horizon line and may be estimated based upon lane markers or any other suitable indicator. The vanishing point is a point on the horizon line where lane markers on the left and right of the vehicle 100 intersect each other. If the lane markers do not intersect on the horizon line, then the vanishing point may be estimated as a midpoint between the left and right lane markers.

A second method for estimating a vanishing point is an example-based method including inferring a vanishing point based upon an input image and a plurality of sample images. The example-based method can be utilized alternatively or additionally to estimate the vanishing point. An exemplary example-based method can be described by collecting a number of sample images of field-of-views, defining an exemplary vanishing point for each of the sample images, matching a current image to one or more of the sample images, and determining a vanishing point based upon the matching. Matching the current image to one or more of the sample images can be accomplished, for example, by identifying features by methods described herein from each of the sample images, identifying features from the current image, comparing the identified features from the current image to a database of identified features from the sample images, and selecting matching sample images to the current image. A vanishing point can be selected from the best matching sample image or can be determined based upon a combination of the nearest matches to the current image.

The sample images are selected to cover a wide variety of geometric layouts, including sample images that are representative of a wide variety of lighting conditions and camera perspectives. In one embodiment, each of the plurality of sample images comprises a different combination of geometric layout, lighting conditions, and camera perspect. The multiple varieties of geometric layouts vary by road curvature and can additionally correspond to different driving environments including urban, rural, highways, gravel roads, tunnels, and/or snow covered roadways. Lighting conditions can be affected by weather conditions and sunlight intensity. Camera perspectives may be affected by vehicle orientation and vehicle lateral offset. Additional sample images may be dynamically selected and stored during vehicle operations based upon unique environmental and/or driving conditions. Sample images may be associated with vehicle position in a mapping database such as global positioning system (GPS). The sample images may then be matched with the current image based upon vehicle position.

An image location on the sample image corresponding to a vanishing point is subjectively defined or may be defined using methods known in the art and checked manually thereafter. The image location corresponding to vanishing point is preferably identifiable by image coordinates and a particular associated sample image, and may be stored in memory of the processing module 120.

Figure 13:
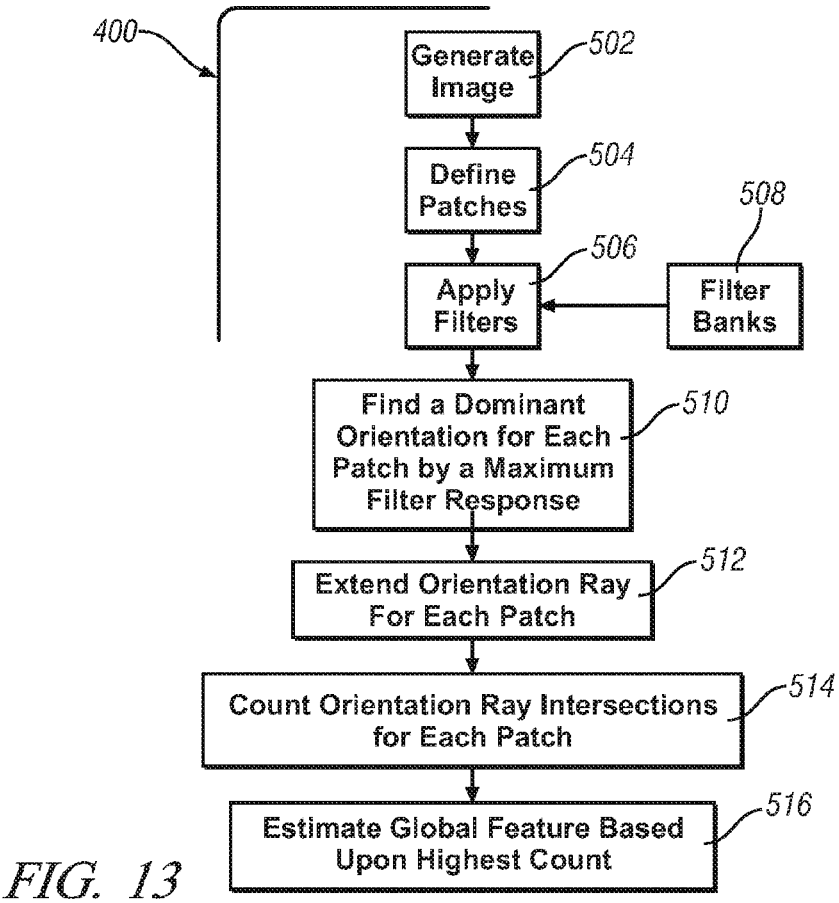
FIG. 13 shows an exemplary method for feature identification and analysis, in accordance with the disclosure.

Features identified on the sample images are preferably determined offline using a feature identification algorithm and stored in memory of the processing module 120. FIG. 13 shows an exemplary method 500 for feature identification and analysis. An image is generated in step 502. Patches are defined to analyze the image in step 504. Filter banks are available as step 508 and are utilized in step 506 to filter the image, generating a filter response for each filter in the bank. These filter response are compared for each patch, and a dominant orientation for features of each patch is defined by a maximum filter response in step 510. An orientation ray can be defined for each patch based upon the dominant orientation defined in step 510, the ray extending through the entire image based upon the dominant orientation. These rays are extended for the image in step 512. Intersections of the rays are counted for the entire image in step 514. The global feature, in this case, estimated vanishing point locations, can be estimated based upon determining the patch with highest count of intersections in step 516.

Multiple filter banks including, e.g., a Leung-Malik filter bank and a Gabor filter bank, may be used to identify texture features on the sample images and the current image. The Leung-Malik filter bank is a multi-scale, multi-orientated filter bank and includes first and second derivatives of Gaussian filters, Laplacian of Gaussian filters, and Gaussian filters. In one embodiment, 48 filters are included in the Leung-Malik filter bank. The Gabor filter bank includes linear filters associated with filter responses defined by a product of a harmonic function and a Gaussian function. Gabor filters can include multiple orientations and parameters.

Filter responses from the filter banks are used to determine a dominant orientation ('$\theta_i$') of component patch ('i'). The dominant orientation $\theta_i$ is a direction that describes the greatest local line structure or texture flow as is indicated by a filter orientation exhibiting a maximum filter response relative to a convolved set of filters. Local line structures may be analyzed by convoluting the component patch with a set of Garbor filters at predetermined orientations. In one embodiment, 72 Garbor filters of varying orientations are used to achieve a filter response for each component patch. The dominant orientation $\theta_i$ of component patch i is a filter orientation exhibiting the maximum filter response relative to an applied set of Garbor filters.

The component patches may be classified based upon the filter response. Component patches exhibiting a filter response greater than a threshold are considered to contain strong texture features and in one embodiment are selected for further analysis. Component patches exhibiting a filter response less than a threshold are considered to contain flat texture features. Component patches corresponding to strong texture features are herein referred to as support patches and component patches corresponding to flat texture features are herein referred to as non-support patches.

The component patches corresponding to a filter response of the dominant orientation $\theta_i$ greater than a predetermined threshold are selected to construct orientation rays within the image. For each of these identifiable component patches i at location (x, y) on the image, an associated orientation ray $r_i = (i, \theta_i)$ is defined. The orientation ray may intersect a number of component patches on the image. A counting function for calculating the number of component patches each ray insects is calculated as follows:

$$C_{x,y}(i) = \sum_{r_i \in R} \text{count}(i, r_{i'}) \qquad [4]$$

where,
R represents the set of orientation rays from all the selected component patches, and count (i, $r_{i'}$) is defined as:

$$\text{count}(i, r_{i'}) = \left\{ \frac{1}{0}, \frac{\text{if ray } r_{i'} \text{ lay on patch } i}{\text{otherwise}} \right. \qquad [5]$$

A 2D histogram of the number of orientation rays intersecting a component patch may be represented as:

$$F = [C_{1,1}(1), C_{1,2}(2), \ldots, C_{(h,w)}(N)] \qquad [6]$$

where,
N is the number of component patches in the image,
h is the height of the image, and
w is the width of the image.

A 1D probability mass function may be calculated based upon the component patches included in the 2D histogram. The 1D probability mass function graphically illustrates a count of orientation rays intersecting each component patch. In one embodiment, the 1D probability mass function may be calculated using the supporting patches. The probability mass is a product of camera translation and rotational information and represents historical statistical information with respect to perspective structure of an image and therefore is independent of image color and illumination changes among images.

After identifying features in the current image, a plurality of candidate sample images are selected that most resemble the current image based upon geometric layout and camera perspective. Matching the current image to one or more of the sample images may be accomplished using a refined database. The refined database stores the plurality of sample images and may be updated to store current images. In one embodiment, the refined database stores short and long term sample images. Short term images may be used and stored for purposes of driving on a particular stretch of roadway and thereafter deleted, while long term images may be stored for purposes of having a representative variety of sample images.

The candidate sample images are selected based upon feature similarities with features in the current image. Feature similarity is determined based upon spatial proximity to feature values determined for each of the sample images and the current image. Candidate sample images including feature values that are spatially related to feature values of the current image are more likely to have a vanishing point that corresponds to the current image.

Figure 14:
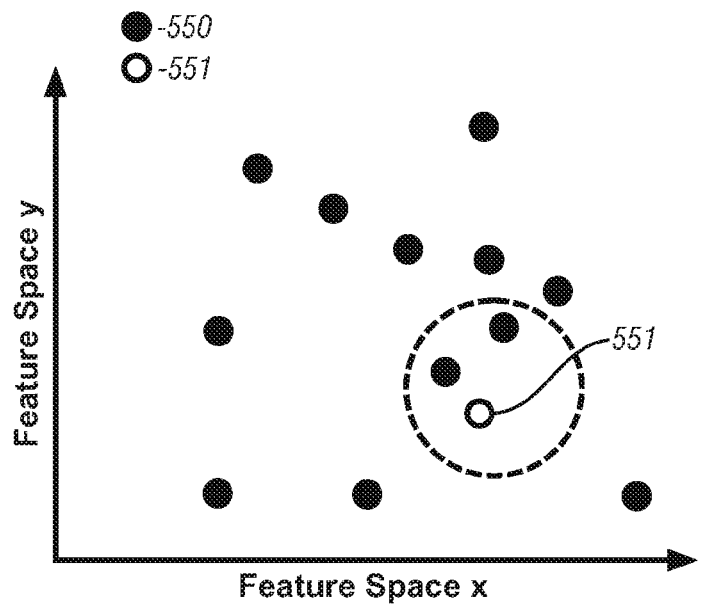
FIG. 14 graphically illustrates an exemplary feature space including exemplary feature values, in accordance with the disclosure.

FIG. 14 graphically illustrates an exemplary feature space including exemplary feature values. The exemplary feature values are identifiable in an exemplary two-dimensional feature space by x and y coordinates and are determined based upon identified features in an image. However, it will be appreciated that the feature space represented is a simple feature space for ease of demonstration, and more complex feature spaces with multiple dimensions can be utilized to more precisely select sample images as candidates. To select the predetermined number of candidate sample images from the plurality of sample images, feature values of the sample images 550 are compared to the feature value of the current image 551. Sample images having feature values in nearest spatial proximity to the feature values of the current image in the feature space are selected for further analysis. Preferably a predetermined number of sample images are selected; in one embodiment 5 sample images are selected. In the exemplary FIG. 14, three feature values are compared with a feature value of the current image.

FIG. 14 depicts feature values in a two-dimensional plot for simplicity in describing the comparison of the current image to sample images. However, it will be appreciated that feature values may include multiple descriptors for the examined images, and the resulting analysis can includes as many dimensions as are required, and the resulting distance calculations can similarly include factors for each of the required dimensions.

One exemplary equation for evaluating spatial proximity ('DF') between a feature value of a sample image and a feature value of a current image may be give as:

$$DF = \sum_{i=1}^{N} f_i^q (f_i^q - f_i^d)^2 \qquad [7]$$

where $f_i^d$ is the feature value of a candidate sample image, and $f_i^q$ is the feature value of the current image, which also serves as the ith weight of that feature in distance calculation.

After selecting a predetermined number of candidate sample images, a vanishing point is inferred using the exemplary vanishing points associated with the candidate sample images. Multiple methods may be used to infer a vanishing point on the current image using the candidate sample images and corresponding vanishing points. In one embodiment, a best or closest match between the candidate sample images and the current image is selected, and the vanishing point for the current image is estimated based upon the vanishing point the best match. In another embodiment, vanishing points locations corresponding to the candidate sample images are averaged. The averaged vanishing point location corresponds to the inferred vanishing point at the image locations in the current image.

Figure 15:
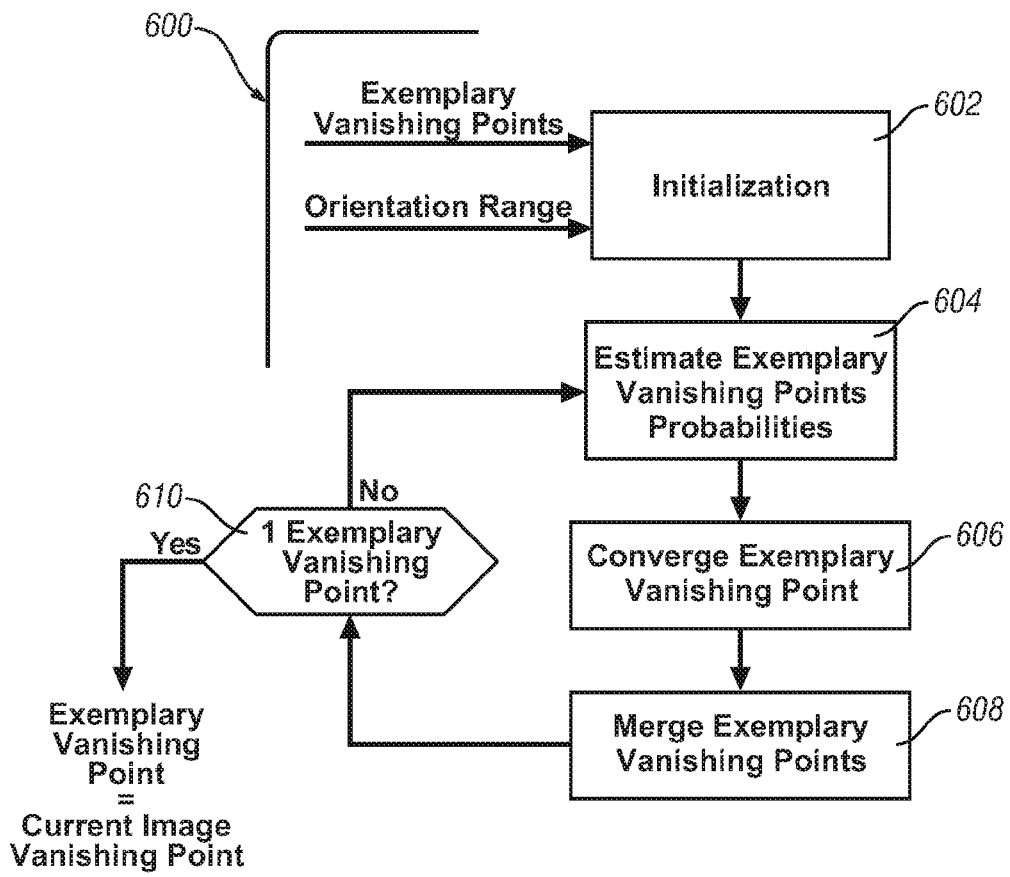
FIG. 15 shows an exemplary iterative probabilistic analysis, in accordance with the disclosure.

In another embodiment, probabilistic analysis is applied to the exemplary vanishing points to converge the exemplary vanishing points to a single vanishing point. FIG. 15 shows an exemplary iterative probabilistic analysis 600. The probabilistic analysis evaluates the exemplary vanishing points based upon distance between vanishing points in the candidate sample images and the current image and orientation rays described herein above. The probabilistic analysis initializes positions of the exemplary vanishing points in a feature space (602) estimating probabilities of the exemplary vanishing points (604) converges the exemplary vanishing points (606), and merges and removes vanishing points (608) until 1 exemplary vanishing point remains (610). The remaining vanishing point is used as the vanishing point for the current image.

The probabilistic analysis initializes the exemplary vanishing points into a modeling function using weighted probabilities and spatial proximity between vanishing points (602). Candidate sample images including features that are more spatially related to features of the current image are more likely to provide an accurate vanishing point for the current image. Therefore, in one embodiment, each vanishing point ('$v_k$') associated with the candidate sample images is assigned an initial prior probability ('P(k)') that the vanishing point in the sample image is the vanishing point in the current image based upon the spatial proximity of the features in the candidate sample image to the features in the current image according to the following formula:

$$P(k) = \frac{1/DF_i}{\sum_{i}^{K} 1/DF_i} \qquad [8]$$

where K is the number of predetermined exemplary vanishing points.

In one embodiment the exemplary vanishing point corresponding to the greatest initial prior probability may be inferred as the vanishing point on the current image.

In another embodiment, a likelihood function may be formulated to estimate image locations of exemplary vanishing points $v_k^t$ at iteration ('t'). The likelihood function models distance between each orientation ray and exemplary vanishing points $v_k^t$. The likelihood function can be used to estimate probabilities for each of the exemplary vanishing points that the exemplary vanishing point is the vanishing point for the current image (604). The likelihood function may be expressed as:

$$L(v_k^t; l_i, k) = \prod_{i=1}^{I} P_t(k) P_t(l_i | k) \qquad [9]$$

where $P_t(l_i|k)$ represents the conditional probability that an orientation ray $l_i$ intersects an exemplary vanishing point $v_k$ that is the vanishing point.

Preferably, the orientation ray will intersect the vanishing point, however, an offset $d(v_k^t, l_i)$ between orientation ray $l_i$ and the vanishing point $v_k$ at position $(x_k, y_k)$ with a normal distribution including zero mean and variance less than a threshold, e.g., $\sigma^2=2$, wherein the orientation rays $l_i$ is parametered to a general form of $\alpha_i x + \beta_i y + \gamma_i = 0$. The offset may be formulated as:

$$N(d(v_k^t, l_i) | 0, \sigma^2) \propto \exp\left(-\frac{d^2(v_k^t, l_i)}{2\sigma^2}\right) \qquad (10)$$

where $d(v_k^t, l_i)$ is defined as $$d(v_k^t, l_i) = (\alpha_k^t x + \beta_k^t y + \gamma_i)/(\sqrt{\alpha_i^2 + \beta_i^2}).$$

Component patches or image areas identified as clear path and including perspective texture are less likely to contain a vanishing point. Similarly, orientation rays may be weighted based upon a normalized sum of maximum responses ('$m_i$') within a patch i:

$$P(m_i) = m_i \bigg/ \sum_{i=t}^{I} m_i$$

where 'I' represents the number of rays in an orientation ray set. Therefore, a posterior confidence formulation may be used to weigh correspondence to the perspective texture and the association with orientation rays. One such formulation is represented as:

$$P(l_i \mid k) \propto \exp\left(-\frac{d^2(v_k^t, l_i)}{2\sigma^2}\right) P(m_i) \quad [11]$$

Given a current location of an exemplary vanishing point $v_k$, a conditional probability $P_t(k \mid l_i)$ of the exemplary vanishing points intersecting an orientation ray $l_i$ may be determined using Bayes theorem. An expected log-likelihood may be calculated based upon the conditional probability. One formula for calculating the expected log-likelihood is:

$$Q(v_k^{t+1} \mid v_k^t) = E[\log L(v_k^t; l_i, k)] \quad [12]$$
$$= \sum_k \sum_i P(k \mid l_i) \log(P(l_i \mid k) P_t(k))$$

A prior probability of the exemplary vanishing point may be updated based upon the conditional probability $P_t(k \mid l_i)$. The updated conditional probability may be calculated by maximizing the expected log-likelihood. One such calculation may be executed using the following formula:

$$P_{t+1}(v_k) = \underset{Pt=(k)}{\mathrm{argmax}}\, Q(v_v^{t+1} \mid v_v^t) = \frac{1}{I}\sum_i^I P_t(k \mid l_i) \quad [13]$$

where I represents the number of corresponding orientation rays and Pt=(k)→Pt(k).

The probabilistic analysis converges the exemplary vanishing points based upon the conditional probability $P_t(k \mid l_i)$ and $P_t(l_i \mid k)$ and the set of orientation rays (606). Position of the exemplary vanishing points may be updated separately by maximizing $Q(v_v^{t+1} \mid v_v^t)$ for each exemplary vanishing point by:

$$v_k^{t+1} = \underset{v_k^t}{\mathrm{argmax}} \sum_{i=1}^{I} P_t(k \mid l_i) \log P_t(l_i \mid k) \quad [14]$$

Alternatively, the estimated position of the exemplary vanishing points may be calculated using a quadratic weighted least-squares approach, weighing the position using the posterior probability of the exemplary vanishing points $P_t(k \mid l_i)$. One such calculation may be executed using the following formula:

$$v_k^{t+1} = \underset{v_k^t}{\mathrm{argmin}} \sum_i P_t(k \mid l_i) d^2(v_k, l_i) \quad [15]$$

Thus, $v_k^{t+1} = (X^T W X)^{-1} X^T W y$ where X and y are the matrix form of $\alpha_i/\sqrt{\alpha_i^2 + \beta_i^2}$, $\beta_i/\sqrt{\alpha_i^2 + \beta_i^2}$, and $-\gamma_i/\sqrt{\alpha_i^2 + \beta_i^2}$ over all the orientation rays cascaded vertically. W represents the diagonal weight matrix generated from $P_t(k \mid l_i)$.

After converging exemplary vanishing points, exemplary vanishing points are merged and/or removed based upon spatial proximity (608). A search algorithm locates distances between exemplary vanishing points including distances less than a predetermined threshold distance apart. When two distances are located that are less than the predetermined threshold distance, the distances are merged using a weighted average into a new vanishing point candidate. The prior probabilities for the exemplary vanishing points are used as weights. In one embodiment, when a distance of one exemplary vanishing point to all other exemplary vanishing points is greater than a threshold distance the exemplary vanishing point is removed from calculation and defined as an outlier.

The probabilistic analysis iteratively converges, merges and removes exemplary vanishing points until 1 exemplary vanishing point remains (610). The remaining vanishing point is inferred as the vanishing point for the current image.

Figure 16:
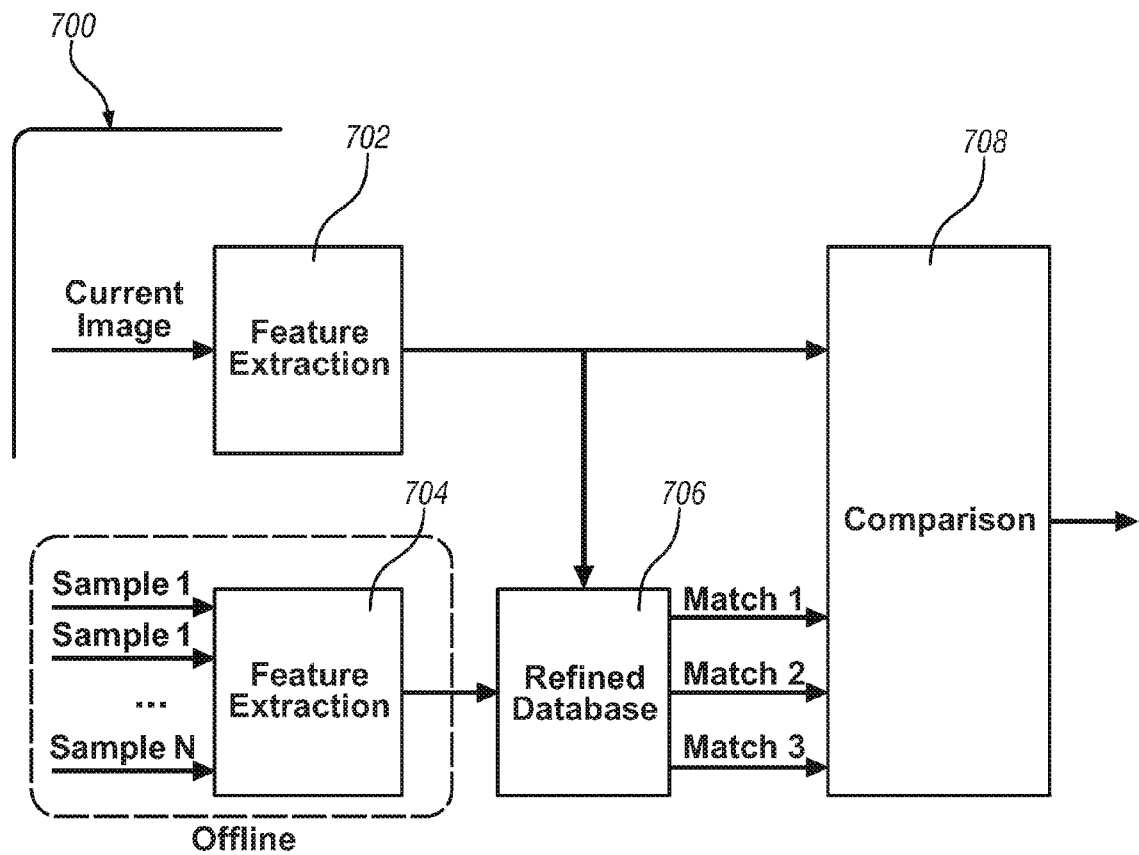
FIG. 16 schematically depicts operation of an exemplary example-based vanishing point method, in accordance with the present disclosure.

FIG. 16 schematically depicts operation of an exemplary example-based vanishing point method, in accordance with the present disclosure. The example-based vanishing point method 700 is illustrated in FIG. 16, and described herein as comprising discrete elements. Such illustration is for ease of description and it should be recognized that the functions performed by these elements may be combined in one or more devices, e.g., implemented in software, hardware, and/or application-specific integrated circuitry. For example, the pixel-based method 700 may be executed as one or more algorithms in the processing module 120.

Method 700 illustrates comparison of a current image to a number of example or sample images to determine a vanishing point. As described above, a number of sample images are analyzed through feature extraction (704), and the features determined, for example, in an offline training process, are stored in a database. Method 700 inputs a current image and performs feature identification upon the image (702). Current features of the current image are identified. The current features are utilized to select one or more matches in the refined database to the current features (706). The corresponding images of the matches are then compared to the current image, and a vanishing point for the current image is determined or inferred based upon the vanishing point for the matching sample image or images (708).

One having skill in the art will appreciate that an example-based vanishing point method as described above can be useful to judge situations wherein visual differences between surfaces, for example, similar colors or isotropic textures not having a dominant direction, or less distinctive features in an image might not lend to accurate results from the other exemplary methods described herein. In such instances, the human-defined vanishing point of the sample images can provide superior input to the location of the vanishing point. Additionally, it will be appreciated that ambiguities or weaknesses in camera detection, for example, a large radial distortion present in some camera images or clustered background buildings, can distort or create inaccuracies in interpretations of images according to other methods described herein. However, such ambiguities or weaknesses in images exist both in the sample images and the current image used in the disclosed example-based vanishing point method and, therefore, tend to cancel out.

As described herein above, the clear path detection analysis may be augmented with the vanishing point estimation analysis to determine an enhanced clear path. Multiple methods for augmenting the clear path detection analysis are contemplated by the disclosure, including augmenting the clear path detection analysis with the example-based vanishing point estimation analysis. However, the order of the methods used or disqualification or substitution of one of the methods can be implemented based upon perceived factors affecting efficiency or performance of the methods. A number of methods to select among the methods and to adjust selection of the various clear path methods are envisioned, and the disclosure is not intended to be limited to particular exemplary embodiments disclosed herein.

A first method for augmenting clear path detection analysis includes identifying a horizon line, i.e., a vanishing line, in the current image. A road surface including a clear path on which to drive is necessarily below the vanishing point or horizon line. A horizon line may be identified using one of the multiple methods described hereinabove. Filtering pixels, component patches, and associated image areas from the clear path detection analysis above the horizon line helps to clarify the pixels being analyzed to identify a road surface from irrelevant pixels. A likelihood analysis may be adopted to incorporate confidence values assigned based upon proximity of the horizon line and/or vanishing point. Such confidence values can be determined experimentally, computationally, or be judged based upon modeling or any other method sufficient to accurately estimate effectiveness of the various clear path methods to determine a clear path based upon the input image.

Figure 17:
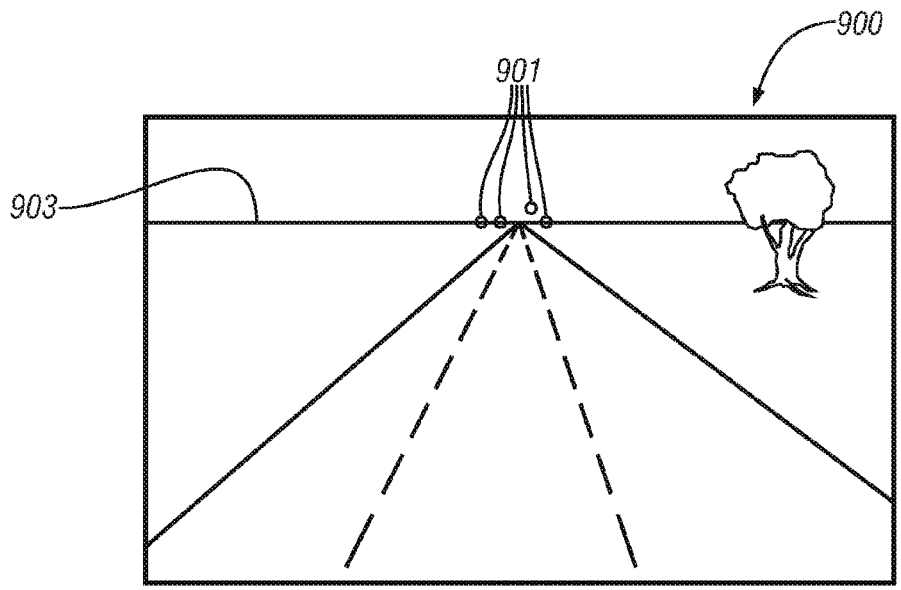
FIG. 17 shows an exemplary image including exemplary vanishing points, in accordance with the disclosure.

An additional method for identifying a horizon line, including use of the exemplary vanishing points described hereinabove, is herein described with reference to FIG. 17. FIG. 17 shows an exemplary image 900 including exemplary vanishing points 901. A horizontal line 903 on the current image corresponding to a number of exemplary vanishing points is defined as the horizon line. When multiple horizontal line correspond to the number of exemplary vanishing points, a horizontal line corresponding to an average of the horizontal lines including exemplary vanishing points may be defined as the horizon line. As FIG. 17 shows, exemplary line 903 is identified as the horizon line for the exemplary image 900. In one embodiment, the horizon line is identified based upon a 2D histogram including historical exemplary vanishing points identified by horizontal row association. The horizontal row corresponding to the greatest number of exemplary vanishing points over a predetermined number of image iterations is defined as the horizon line.

Figure 18:
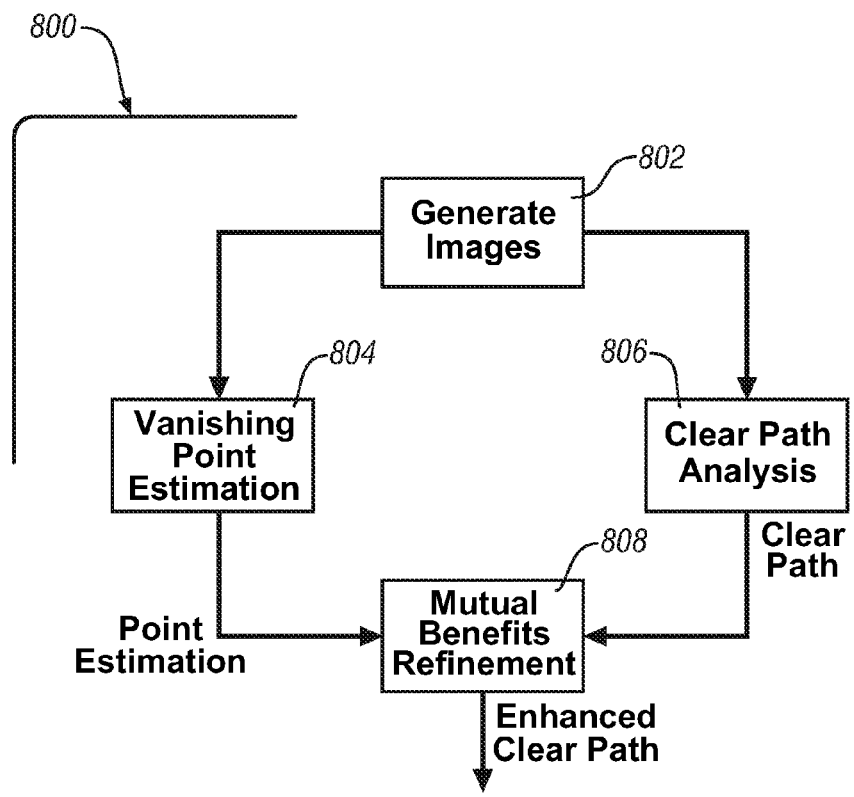
FIG. 18 schematically depicts operation and mutual refinement of clear path detection analysis and vanishing point estimation analysis, in accordance with the disclosure.

FIG. 18 schematically depicts operation and mutual refinement of clear path detection analysis 806 and vanishing point estimation analysis 804, in accordance with the present disclosure. Mutual refinement of the clear path detection analysis 808 determines an enhanced clear path, while refinement of the vanishing point estimation analysis 804 enhances vanishing point estimation. In an exemplary iterative method 808, the example-based vanishing point estimation analysis is used to update and refine the clear path detection analysis and the clear path detection analysis is used to update and refine the example-based vanishing point estimation analysis.

The vanishing point estimation analysis may be used to define supporting and non-supporting component patches within the current image. Support patches may be defined as corresponding to a predetermined threshold quantity of orientation rays that intersect an exemplary vanishing point, while non-supporting patches do not correspond to a threshold quantity of orientation rays. The support patches may correspond to perspective texture representing line patterns on the current image, e.g., lane markers and control signs. Non-supporting patches exhibit textureless patterns on the image and exhibit a greater clear path confidence likelihood. Supporting patches analyzed for correspondence to exemplary vanishing points with error rates less than 3σ.

Supporting patches are analyzed using spatial correspondence to clear path image areas. Supporting patches surrounded by clear path image areas correspond to a lane marker. Supporting patches neighboring clear path image areas on one side and not clear path image areas on an opposite side correspond to curbs on a roadway and edges on objects in a field-of-view.

Non-supporting patches, image areas corresponding to curbs on a roadway, and object edges may be used to update and refine the clear path detection analysis. Non-supporting patches, as described hereinabove, correspond to flat texture on an image. Flat texture indicates corresponds to a clear path in a field-of-view. In one embodiment, a likelihood analysis may be adopted to incorporate confidence values assigned based upon proximity to image areas corresponding to a non-supporting patch.

Similarly, clear path detection analysis may be used to refine vanishing point estimation analysis. Vanishing points correspond to texture rich image areas and edges. In one embodiment, a likelihood analysis may be adopted to incorporate confidence values assigned based upon association with clear path image areas. Image areas identified as not clear may additionally be used in the likelihood analysis. The clear path detection analysis may further be used in identifying the supporting and non-supporting patches. Image areas identified as clear by the clear path detection analysis may increase confidence that a patch is a non-supporting patch.

Step 808 of FIG. 18 illustrates mutual benefits refinement, inputting a clear path and vanishing point information, to output an enhanced clear path. As will be appreciated from the above described methods, clear path can benefit from vanishing point estimation, augmenting an understanding of what areas of an image are likely to be a clear path. Similarly, clear path detection analysis may be used to refine vanishing point estimation analysis. Vanishing points correspond to texture rich image areas and edges. In one embodiment, a likelihood analysis may be adopted to incorporate confidence values assigned based upon association with clear path image areas. Image areas identified as not clear may additionally be used in the likelihood analysis. The clear path detection analysis may further be used in identifying the supporting and non-supporting patches. Image areas identified as clear by the clear path detection analysis may increase confidence that a patch is a non-supporting patch. Such an analysis can be iteratively reinforced with subsequent images, building confidence along the route of travel of both the clear path and the location of the vanishing point. Additionally, a single image can be iteratively examined, with multiple iterations of clear path analysis and vanishing point analysis of the single image. Such an analysis loop can beneficially refine starting assumptions and results of the analyses.

Figure 19:
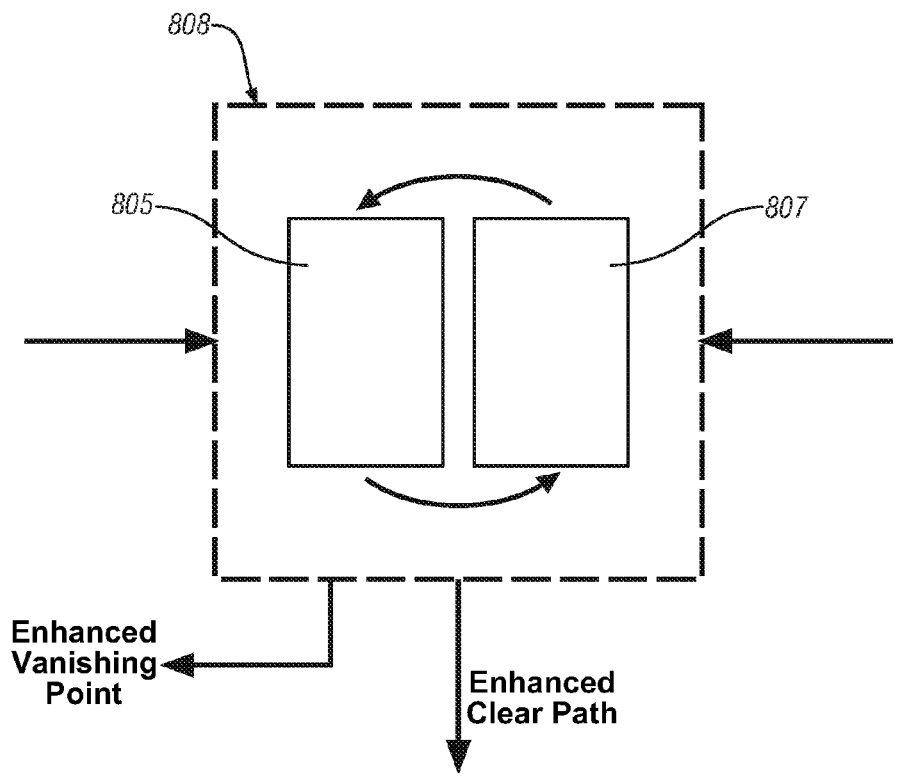
FIG. 19. schematically depicts operation of an exemplary mutual benefits refinement step, in accordance with the present disclosure.

FIG. 19 graphically depicts such an iterative analysis, in accordance with the present disclosure. Step 808 is depicted, including vanishing point refinement in step 805 and clear path refinement in step 807. As described above, iterative results of both the clear path and the vanishing point estimation can be utilized to refine the other. Step 808 outputs both the enhanced clear path, as described above, and additionally exemplary enhanced vanishing point information.

Figure 20:
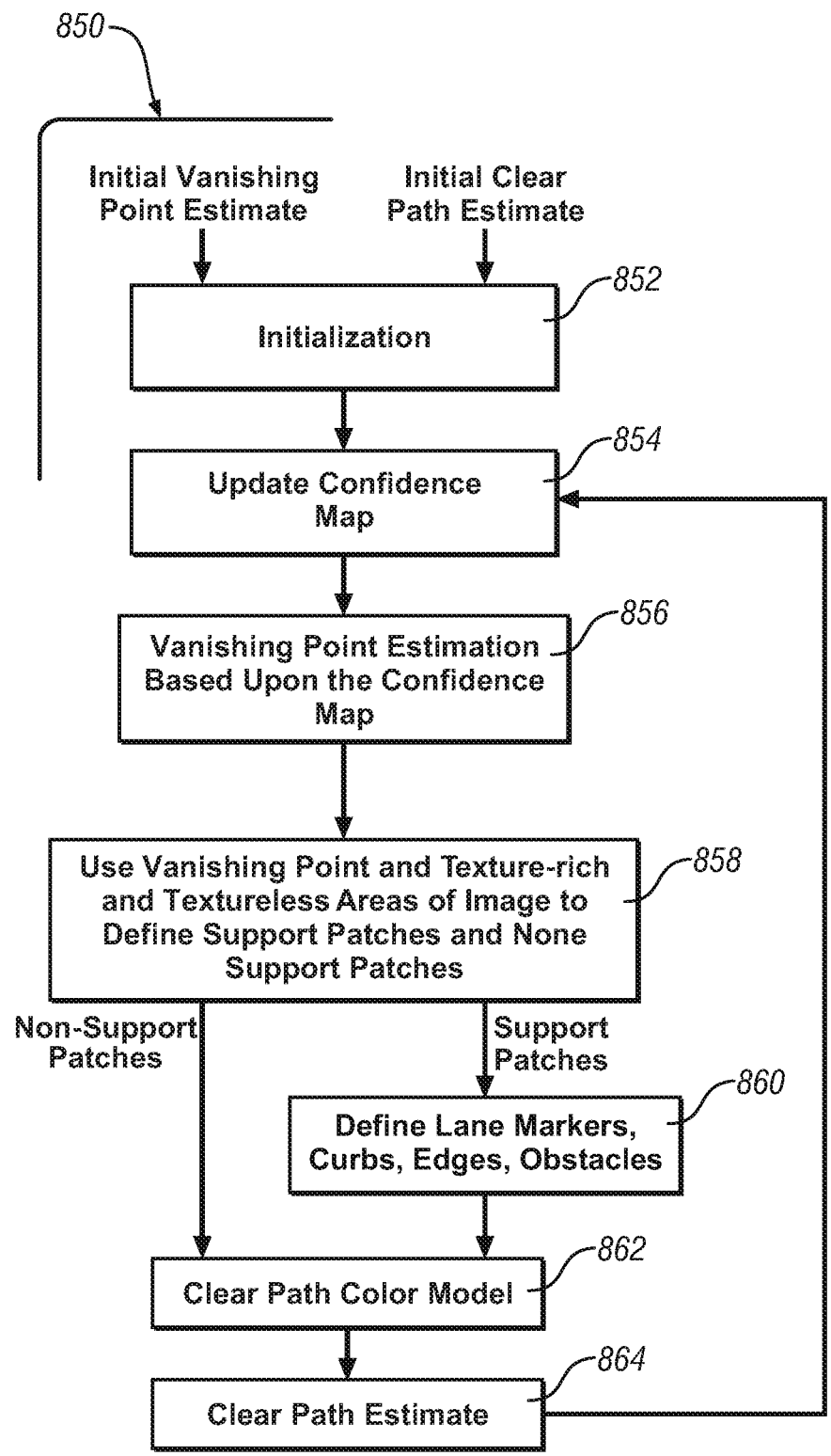
FIG. 20 graphically illustrates an exemplary process whereby mutual benefits refinement can be performed, in accordance with the present disclosure.

FIG. 20 graphically illustrates an exemplary process whereby mutual benefits refinement can be performed, in accordance with the present disclosure. As developed in exemplary steps 804 and 806 above, an initial vanishing point estimate and an initial clear path estimate are inputs. The process 850 is initialized in step 852. The initial vanishing point estimate and an initial clear path estimate are overlaid with the input image, and a confidence map is developed. A confidence map can be developed in any way sufficient to define both a clear path and structures necessary for determining an estimated vanishing point. In one exemplary embodiment, color coded patches can be utilized to represent different confidence indicators as described below. Such an exemplary confidence map is started in step 854. In step 856, structures in the image such as patches with texture-rich properties useful to describing a vanishing point are used to estimate an updated vanishing point based upon the confidence map. In step 858, analysis of the updated vanishing point, texture-rich, and textureless areas of the image are used to define support patches including information, such as lane markers, curbs, edges, and detected obstacles, useful to estimate a vanishing point. Additionally, non-support patches are defined including textureless areas on the ground not providing information for determining a vanishing point. It will be appreciated that areas of the image not included as support patches or non-support patches can be defined as unused patches. In step 860, support patches can be optionally identified, for example, with lane markers representing potentially clear path, while other support patches such as curbs and other vehicles are not clear paths. In step 862, a clear path color model is defined for use in updating the clear path estimate and the confidence map, wherein the clear path color model assigns colors to the various properties defined for the patches above. The clear path color model is used to update a clear path estimate in step 864 and used to reiterate the process at step 854, updating the confidence map.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for estimating a vanishing point in a roadway using a current image generated by a camera on a vehicle, the method comprising:
   defining an exemplary vanishing point for each of a plurality of sample images;
   identifying features within each of the plurality of sample images;
   monitoring the current image generated by the camera;
   identifying features within the current image;
   matching the current image to at least one of the sample images based upon the identified features within the current image and the identified features within the plurality of sample images;
   determining the vanishing point based upon the matching and the exemplary vanishing point for each of the plurality of sample images that have been matched with the current image;
   determining a horizon line on the current image based upon the exemplary vanishing points comprising:
      identifying a greatest number of the exemplary vanishing points along a horizontal row over the plurality of sample images as the horizon line, the current image is a separate and distinct image from each of the plurality of sample images; and
   utilizing the vanishing point and the horizon line to navigate the vehicle.

2. The method of claim 1, further comprising:
   utilizing the vanishing point and the horizon line to determine a clear path of travel for the vehicle; and
   wherein utilizing the vanishing point and the horizon line to navigate the vehicle comprises utilizing the clear path of travel to navigate the vehicle.

3. The method of claim 2, wherein the horizontal line is identified utilizing a two-dimensional histogram; and
   wherein utilizing the vanishing point and the horizon line to determine the clear path of travel for the vehicle comprises determining the clear path of travel based upon an image area below the horizon line.

4. The method of claim 2, further comprising:
   filtering a plurality of image areas on the current image using a plurality of linear filters to obtain a filter response;
   determining a dominant orientation of the filter response for each of the image areas;
   determining an orientation ray based upon the dominant orientation for each of the image areas; and
   determining a quantity of intersections among the image areas and the orientation rays for each of the image areas.

5. The method of claim 4, further comprising:
   determining clear path image areas based upon the quantity of intersections among the image areas and the orientation rays.

6. A method for estimating a vanishing point in a roadway using a current image generated by a camera on a vehicle, the method comprising:
   defining an exemplary vanishing point for each of a plurality of sample images;
   identifying features within each of the plurality of sample images;
   monitoring the current image generated by the camera;
   identifying features within the current image, comprising:
      filtering a plurality of image areas on the current image using a plurality of linear filters to obtain a filter response;
      determining a dominant orientation of the filter response for each of the image areas;
      determining an orientation ray based upon the dominant orientation for each of the image areas;
      determining a quantity of intersections among image areas and the orientation rays for each of the image areas;
      determining clear path image areas based upon the quantity of intersections; and
      utilizing a clear path detection analysis to identify the image areas on the current image corresponding to said clear path image areas, wherein image areas surrounded by said clear path image areas correspond to lane markers, and
      wherein image areas neighboring said clear path image areas on a first side and not clear path image areas on an opposite side correspond to lane boundaries;
   matching the current image to at least one of the plurality of sample images based upon the identified features within the current image and the identified features within the plurality of sample images;
   determining the vanishing point based upon the matching and the exemplary vanishing point for each of the plurality of sample images that have been matched to the current image;
   utilizing the vanishing point to determine a clear path of travel for the vehicle; and
   utilizing the clear path of travel to navigate the vehicle.

7. The method of claim 6, wherein image areas intersected by less than a predetermined threshold of orientation rays correspond to the clear path of travel for the vehicle.

8. The method of claim 6, wherein image areas intersected by greater than a predetermined threshold of the orientation rays correspond to the features within the current image.

9. A method for estimating a vanishing point in a roadway using a current image generated by a camera on a vehicle, the method comprising:
- defining an exemplary vanishing point for each of a plurality of sample images;
- identifying features within each of the plurality of sample images;
- monitoring the current image generated by the camera;
- identifying features within the current image;
- matching the current image to at least one of the plurality of sample images based upon the identified features within the current image and the identified features within the plurality of sample images;
- determining the vanishing point based upon the matching and the exemplary vanishing point for each of the plurality of sample images that have been matched to the current image, comprising:
  - initializing positions of the exemplary vanishing points in a feature space;
  - for each of the exemplary vanishing points, estimating a probability that the exemplary vanishing point corresponds to the vanishing point in the current image;
  - converging the exemplary vanishing points based upon the estimated probability; and
  - merging vanishing points based upon distance between exemplary vanishing points; and
- utilizing the vanishing point to navigate the vehicle.

10. The method of claim 9, further comprising:
- removing the exemplary vanishing points residing a predetermined threshold distance.

* * * * *